(12) United States Patent
Sowa et al.

(10) Patent No.: US 8,089,695 B2
(45) Date of Patent: *Jan. 3, 2012

(54) LINE HEAD AND IMAGE FORMING APPARATUS USING THE SAME

(75) Inventors: Takeshi Sowa, Matsumoto (JP); Yujiro Nomura, Shiojiri (JP); Ryuta Koizumi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 713 days.

This patent is subject to a terminal disclaimer.

(21) Appl. No.: 12/211,667

(22) Filed: Sep. 16, 2008

(65) Prior Publication Data

US 2009/0086328 A1   Apr. 2, 2009

(30) Foreign Application Priority Data

Sep. 27, 2007 (JP) .................. 2007-251054
Jun. 2, 2008 (JP) .................. 2008-144143

(51) Int. Cl.
G02B 27/10 (2006.01)
G02B 9/00 (2006.01)
G03B 27/52 (2006.01)

(52) U.S. Cl. .......................... 359/622; 359/739; 355/55

(58) Field of Classification Search .......... 359/738–740, 359/618–624, 626, 637, 639; 355/55–56, 355/62–63; 362/509, 511–512, 217.02, 217.06, 362/217.07, 235–237, 244, 311.01, 311.06, 362/311.15; 353/34, 100

See application file for complete search history.

(56) References Cited

U.S. PATENT DOCUMENTS

| 6,246,526 B1 * | 6/2001 | Okuyama ............... 359/621 |
| 6,822,799 B2 * | 11/2004 | Kitamura et al. ......... 359/622 |
| 2009/0052943 A1 | 2/2009 | Sowa et al. |
| 2009/0086328 A1 | 4/2009 | Sowa et al. |

FOREIGN PATENT DOCUMENTS

| JP | 02-004546 | 1/1990 |
| JP | 06-278314 | 10/1994 |
| JP | 06-344596 | 12/1994 |

* cited by examiner

*Primary Examiner* — Dawayne Pinkney
(74) *Attorney, Agent, or Firm* — DLA Piper LLP (US)

(57) ABSTRACT

A line head includes: a positive lens system having two lenses with positive refractive power; an image-side lens array in which the image-side lens of the two lenses is arrayed in a plural number in first and second directions; an object-side lens array in which the object-side lens of the two lenses is arrayed in a plural number in the first and second directions; a light emitter array in which a plurality of light-emitting elements are arrayed on an object side of the positive lens system for the one positive lens system; and an aperture plate that forms an aperture diaphragm disposed on the object side of the positive lens system so that an image side is telecentric or approximately telecentric. Assuming that the row number of lenses arrayed in the second direction of the image-side lens array is m, a gap between effective regions of the two image-side lenses adjacent to each other in the first direction is $\alpha$, an image-side angle of aperture (half angle) of the positive lens system is $\theta_i$, a width (full width) of a plurality of light-emitting element images in the first direction, which are images on image surfaces of the plurality of light-emitting elements arrayed for the one positive lens system, is $W_i$, a focal length of the image-side lens is $f_2$, and a distance from an image-side principal plane of the image-side lens to the image surface is $S_i$, the following conditions, $f_2 \leq (mW_i - \alpha)/(2\theta_i)$, $W_i \geq 2S_i\theta_i/(m-1) + \alpha/(m-1)$, are satisfied.

8 Claims, 32 Drawing Sheets

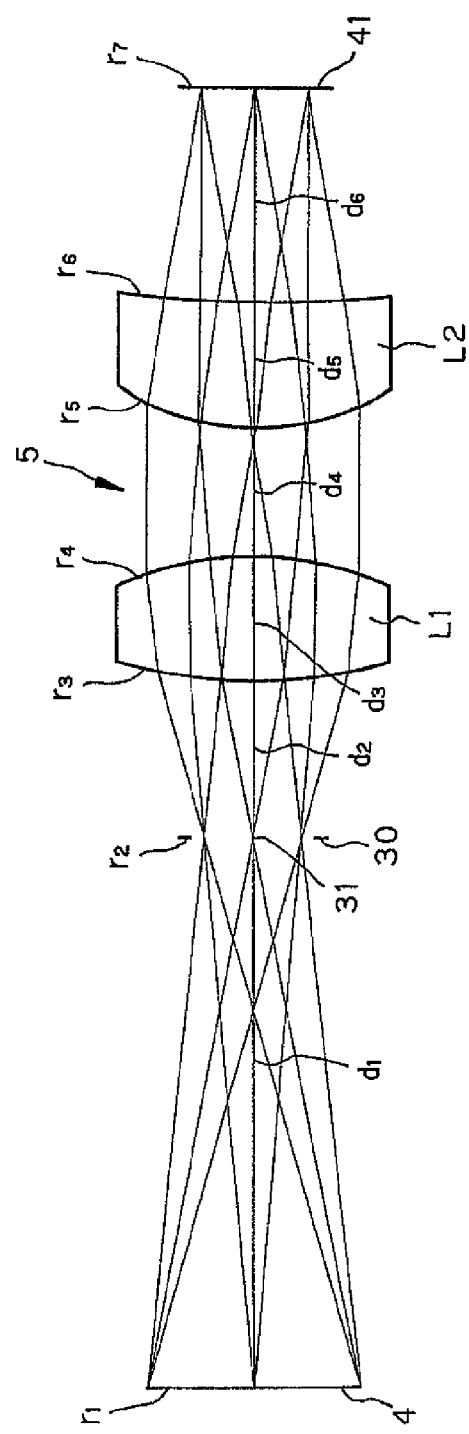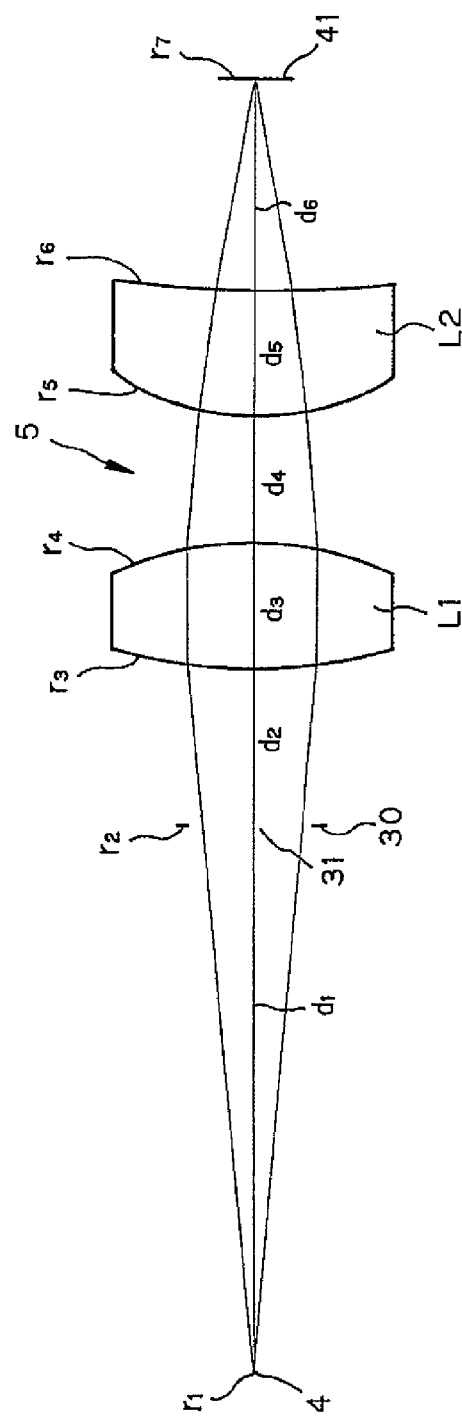
FIG.29A
FIG.29B

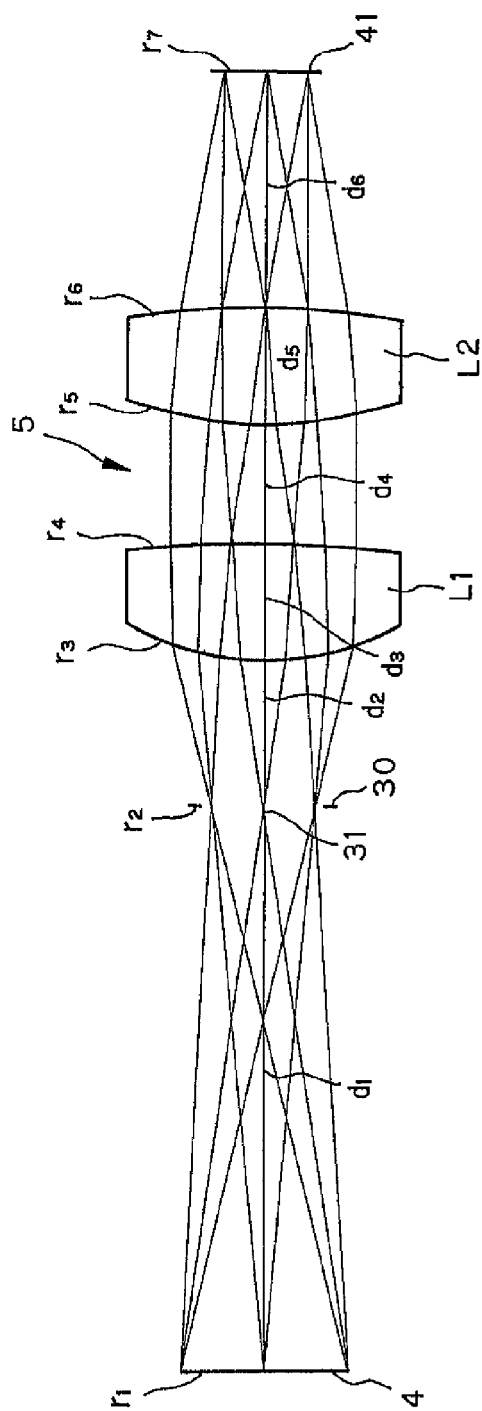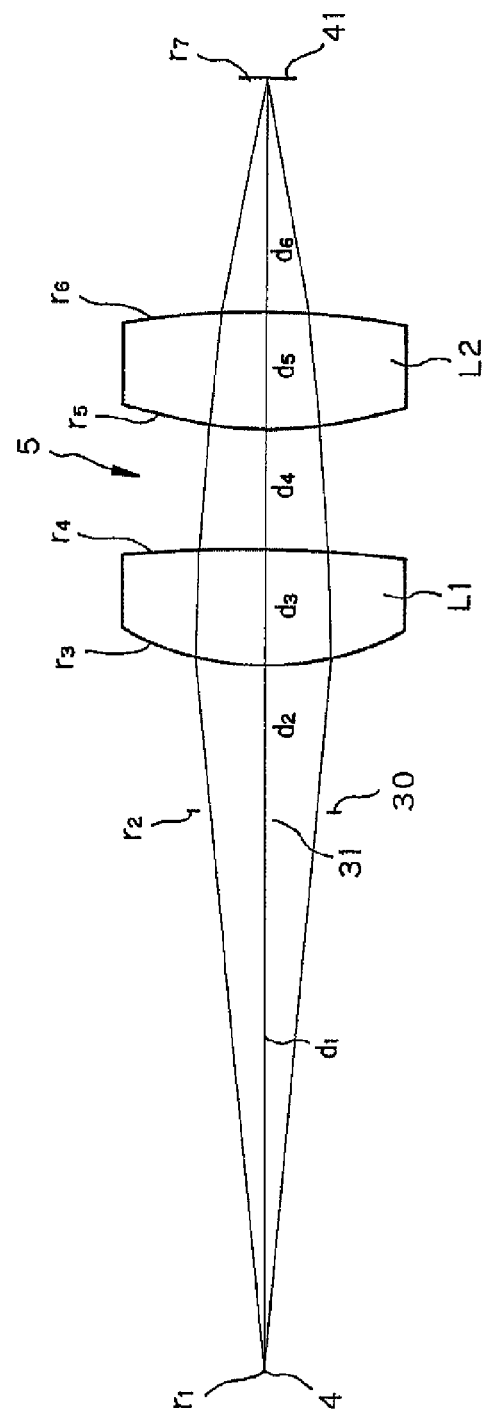

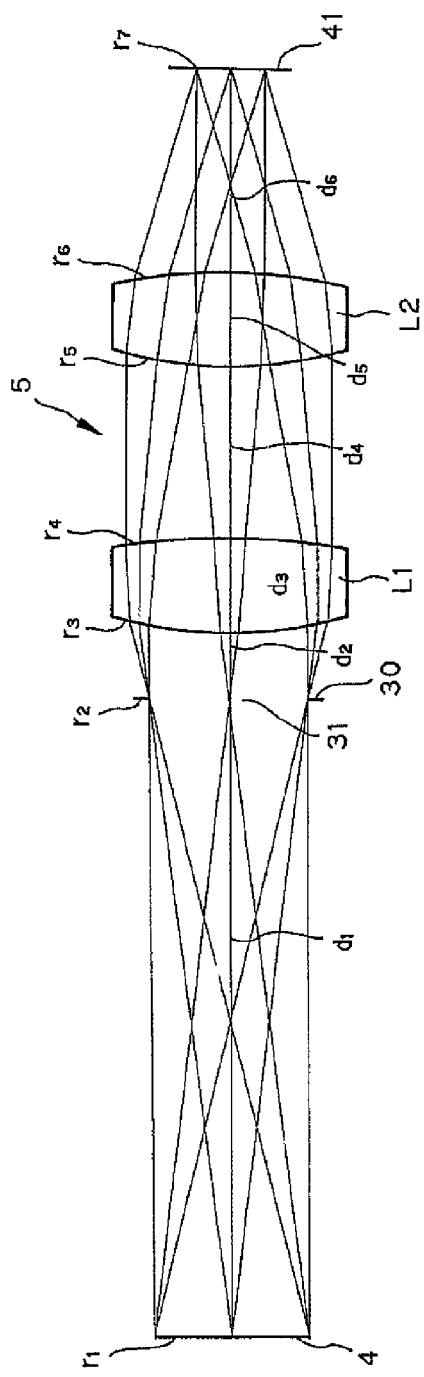
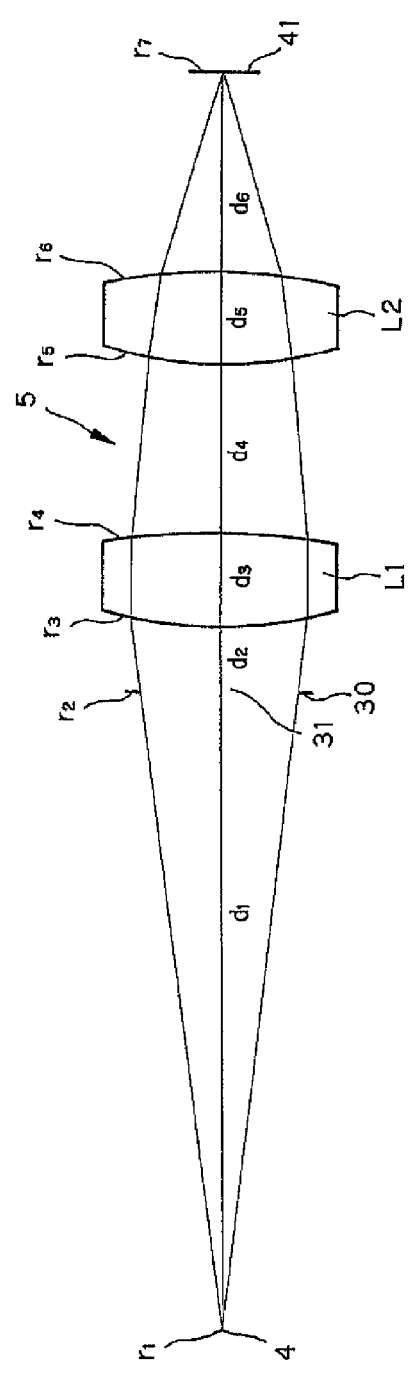
FIG.32A
FIG.32B

LINE HEAD AND IMAGE FORMING APPARATUS USING THE SAME

CROSS REFERENCE TO RELATED ART

The disclosure of Japanese Patent Applications No. 2007-251054 filed on Sep. 27, 2007 and No. 2008-144143 filed on Jun. 2, 2008 including specification, drawings and claims is incorporated herein by reference in its entirety.

BACKGROUND

1. Technical Field

The present invention relates to a line head and an image forming apparatus using the same and in particular, to a line head that forms an imaging spot row by projecting a light-emitting element row onto an irradiated surface using a microlens array and an image forming apparatus using the same.

2. Related Art

JP-A-2-4546 proposes an optical writing line head, in which a plurality of LED array chips are disposed in the LED array direction and the LED array of each LED array chip is projected onto a photoconductor in an enlarged manner by a positive lens disposed corresponding thereto such that images of light-emitting dots at the ends of the LED array chips adjacent on the photoconductor are formed adjacent to each other with the same pitch as a pitch between images of light-emitting dots of the same LED array chips, and an optical reading line head in which the optical path is oppositely set.

Furthermore, JP-A-6-344596 proposes making the focal depth large by configuring a positive lens with two lenses in the same arrangement as disclosed in JP-A-2-4546 and making projected beams approximately parallel beams.

Furthermore, JP-A-6-278314 proposes an optical writing line head in which LED array chips are disposed in two rows at distances therebetween, the repeat phase is shifted by a half period, and positive lens arrays are disposed in two rows in a condition where each positive lens corresponds to each LED array chip such that images of the light emitting dot array on a photoconductor are aligned.

In the above known techniques, if an angle of view of each positive lens increases, a decrease in the amount of peripheral light becomes large according to a fourth power of cosine rule (shading). In order to prevent the concentration unevenness of a printing image caused by the shading, it is necessary to make constant the light amount of each pixel (light-emitting dot image) on the image surface. In order to do so, however, the shading should be corrected by changing the light amount of the light source (light-emitting dot) for every light-emitting dot. However, the emission intensity of a light source pixel (light-emitting dot) affects a life characteristic. Accordingly, if the shading of an optical system becomes large, the light amount unevenness of the light-emitting dot pitch occur with time, even if the uniform image surface light amount is obtained in an early stage by adjusting the light amount for every light-emitting dot. This causes the image concentration unevenness.

In addition, in case of arranging a plurality of rows of light-emitting dot arrays in the sub-scanning direction, the width of an optical writing line head in the sub-scanning direction becomes large if the lens diameter of an optical system increases. As a result, it becomes difficult to make an image forming apparatus small.

SUMMARY

An advantage of some aspects of the invention is to make a line head and an image forming apparatus using the same small by making the lens diameter of each lens system as small as possible in an optical writing line head in which a plurality of light-emitting elements are arrayed in rows corresponding to each lens of a plurality of positive lenses arrayed in a line shape.

Another advantage of some aspects of the invention is to make sure that unevenness caused by the positional deviation of light-emitting dot images does not occur even if a writing surface moves in the optical axis direction.

According to an aspect of the invention, a line head includes: a positive lens system having two lenses with positive refractive power; an image-side lens array in which the image-side lens of the two lenses is arrayed in a plural number in first and second directions; an object-side lens array in which the object-side lens of the two lenses is arrayed in a plural number in the first and second directions; a light emitter array in which a plurality of light-emitting elements are arrayed on an object side of the positive lens system for the one positive lens system; and an aperture plate that forms an aperture diaphragm disposed on the object side of the positive lens system so that an image side is telecentric or approximately telecentric. Assuming that the row number of lenses arrayed in the second direction of the image-side lens array is m, a gap between effective regions of the two image-side lenses adjacent to each other in the first direction is $\alpha$, an image-side angle of aperture (half angle) of the positive lens system is $\theta_i$, a width (full width) of a plurality of light-emitting element images in the first direction, which are images on image surfaces of the plurality of light-emitting elements arrayed for the one positive lens system, is $W_i$, a focal length of the image-side lens is $f_2$, and a distance from an image-side principal plane of the image-side lens to the image surface is $S_i$, the following conditions are satisfied.

$$f_2 \leq (mW_i - \alpha)/(2\theta_i) \quad (21)$$

$$W_i \geq 2S_i\theta_i/(m-1) + \alpha/(m-1) \quad (24)$$

By adopting such a configuration, positional deviation of an imaging spot does not occur even if the position of a writing surface deviates in the direction of an optical axis. Accordingly, deterioration of an image formed can be prevented and the effective diameter of an object-side lens of two lenses, which form each positive lens system of a lens array, can be made approximately equal or smaller than the effective diameter of an image-side lens. As a result, the positive lens system can be disposed in the shape of an array while avoiding the interference between adjacent positive lens systems.

Here, the first direction is a main scanning direction and the second direction is different from the main scanning direction. In addition, the first direction is also different from a sub-scanning direction perpendicular or approximately perpendicular to the main scanning direction.

A plurality of image-side lenses are arrayed as a lens row in the first direction and a plurality of lens rows are arrayed in the second direction, such that lenses are arrayed in a two-dimensional manner. As a result, an image-side lens array is formed. Similarly, object-side lenses are also arrayed in the two-dimensional manner, forming an object-side lens array.

In this case, it is preferable that the width (full width) $W_i$ of the plurality of light-emitting element images in the first direction have the following condition.

$$W_i = 2S_i\theta_i/(m-1) + \alpha/(m-1) \quad (24)'$$

By adopting such a configuration, the effective diameter of the image-side lens can be suppressed small in addition to the operation and effects described above.

According to another aspect of the invention, a line head includes: a positive lens system having two lenses with positive refractive power; an image-side lens array in which the image-side lens of the two lenses is arrayed in a plural number in first and second directions; an object-side lens array in which the object-side lens of the two lenses is arrayed in a plural number in the first and second directions; a light emitter array in which a plurality of light-emitting elements are arrayed on an object side of the positive lens system for the one positive lens system; and an aperture plate that forms an aperture diaphragm disposed on the object side of the positive lens system so that an image side is telecentric or approximately telecentric. Assuming that the row number of lenses arrayed in the second direction of the lens array is m, an image-side angle of aperture (half angle) of the positive lens system is $\theta_i$, a width (full width) of a plurality of light-emitting element images in the first direction, which are images on image surfaces of the plurality of light-emitting elements arrayed for the one positive lens system, is $W_i$, a focal length of the image-side lens is $f_2$, and a distance from an image-side principal plane of the image-side lens to the image surface is $S_i$, the following conditions are satisfied.

$$f_2 \leq mW_i/(2\theta_i) \tag{26}$$

$$W_i \geq 2S_i\theta_i/(m-1) \tag{27}$$

By adopting such a configuration, positional deviation of an imaging spot does not occur even if the position of a writing surface deviates in the direction of an optical axis. Accordingly, deterioration of an image formed can be prevented and the effective diameter of an object-side lens of two lenses, which form each positive lens system of a lens array, can be made approximately equal or smaller than the effective diameter of an image-side lens. As a result, the positive lens system can be disposed in the shape of an array while avoiding the interference between adjacent positive lens systems.

In this case, it is preferable that the width (full width) $W_i$ of the plurality of light-emitting element images in the first direction have the following condition.

$$W_i = 2S_i\theta_i/(m-1) \tag{27'}$$

By adopting such a configuration, the effective diameter of the image-side lens can be suppressed small in addition to the operation and effects described above.

According to still another aspect of the invention, a line head includes: a positive lens system having two lenses with positive refractive power; an image-side lens array in which the image-side lens of the two lenses is arrayed in a plural number in first and second directions; an object-side lens array in which the object-side lens of the two lenses is arrayed in a plural number in the first and second directions; a light emitter array in which a plurality of light-emitting elements are arrayed on an object side of the positive lens system for the one positive lens system; and an aperture plate that forms an aperture diaphragm disposed on the object side of the positive lens system so that an image side is telecentric or approximately telecentric. The image-side lens is a plano-convex lens whose image-side surface is a flat surface. assuming that the row number of lenses arrayed in the second direction of the image-side lens array is m, a gap between effective regions of the two image-side lenses adjacent to each other in the first direction is $\alpha$, an image-side angle of aperture (half angle) of the positive lens system is $\theta_i$, a width (full width) of a plurality of light-emitting element images in the first direction, which are images on image surfaces of the plurality of light-emitting elements arrayed for the one positive lens system, is $W_i$, a focal length of the image-side lens is $f_2$, and a distance from an image-side flat surface of the image-side lens to an image surface is $d_2'$, an optical-axis-direction distance from a point where an outermost light beam of light flux, which converges on the light-emitting element image located at the end in the first direction of the plurality of light-emitting element images that are images on image surfaces of the plurality of light-emitting elements arrayed for the one positive lens system, is incident on an object-side convex surface of the image-side lens to the image-side flat surface of the image-side lens is $e_{t2}$, and a refractive index of the image-side lens is $n_2$, the following conditions are satisfied.

$$f_2 \leq (mW_i - \alpha)/(2\theta_i) \tag{21}$$

$$W_i \geq 2(d_2' + e_{t2}/n_2)\theta_i/(m-1) + \alpha/(m-1) \tag{41}$$

By adopting such a configuration, positional deviation of an imaging spot does not occur even if the position of a writing surface deviates in the direction of an optical axis. Accordingly, deterioration of an image formed can be prevented and the effective diameter of an object-side lens of two lenses, which form each positive lens system of a lens array, can be made approximately equal or smaller than the effective diameter of an image-side lens. As a result, the positive lens system can be disposed in the shape of an array while avoiding the interference between adjacent positive lens systems.

In this case, it is preferable that the width (full width) $W_i$ of the plurality of light-emitting element images in the first direction have the following condition.

$$W_i = 2(d_2' + e_{t2}/n_2)\theta_i/(m-1) + \alpha/(m-1) \tag{41'}$$

By adopting such a configuration, the effective diameter of the image-side lens can be suppressed small in addition to the operation and effects described above.

In the above cases, it is preferable that the aperture plate be disposed adjacent to the object-side lens of the positive lens system.

By adopting such a configuration, an angle of view can be made smaller. As a result, shading can be further reduced.

Furthermore, it may be possible to form an image forming apparatus including: a latent image carrier; a charging unit that electrically charges the latent image carrier; the above-described line head; and a developing unit that develops the latent image carrier.

By adopting such a configuration, it is possible to form an image forming apparatus, such as a printer, which is small, has high resolution, and has little deterioration of an image.

BRIEF DESCRIPTION OF THE DRAWINGS

The invention will be described with reference to the accompanying drawings, wherein like numbers reference like elements.

FIGS. 29A and 29B are cross-sectional views taken along the main scanning direction and the sub-scanning direction illustrating an optical system corresponding to one microlens in a first example.

FIGS. 30A and 30B are cross-sectional views taken along the main scanning direction and the sub-scanning direction illustrating an optical system corresponding to one microlens in a second example.

FIGS. 32A and 32B are cross-sectional views taken along the main scanning direction and the sub-scanning direction illustrating an optical system corresponding to one microlens in a fourth example.

DESCRIPTION OF EXEMPLARY EMBODIMENTS

Before explaining an optical system of a line head according to an embodiment of the invention in detail, the arrangement and light emission timing of light-emitting elements of the line head will be briefly described.

Figure 4:
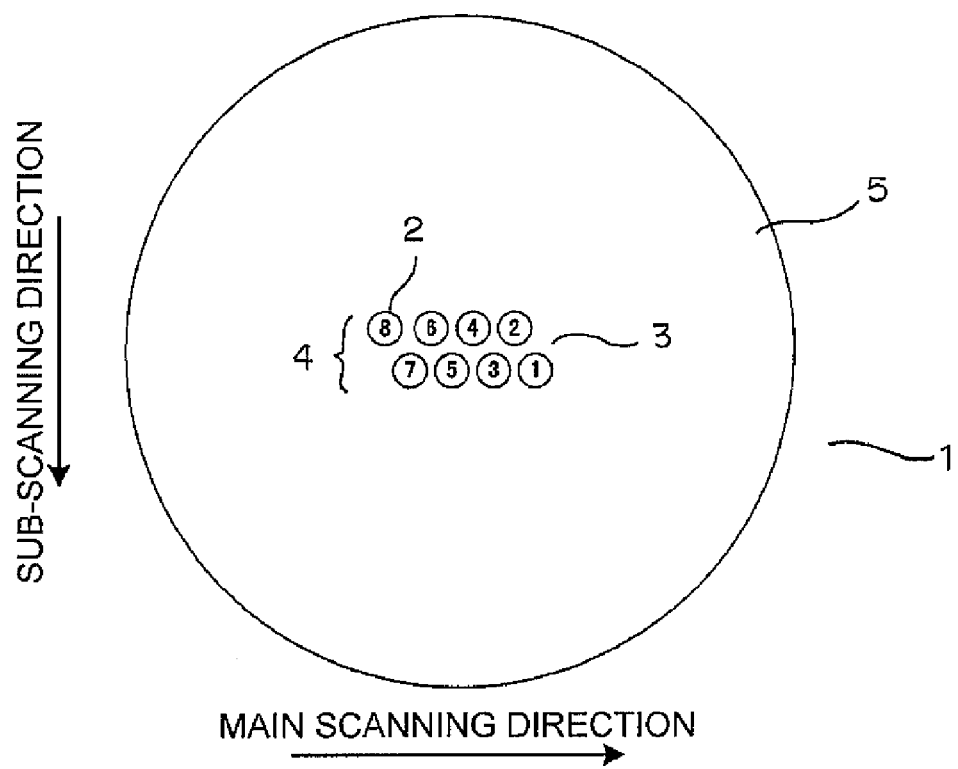
FIG. 4 is an explanatory view illustrating the correspondence relationship between a light emitter array and a microlens with minus optical magnification in an embodiment of the invention.

FIG. 4 is an explanatory view illustrating the relationship between a light emitter array 1 and a microlens 5 with minus optical magnification in an embodiment of the invention. In the line head according to the present embodiment, two rows of light-emitting elements correspond to one microlens 5. Here, since the microlens 5 is an imaging device with minus optical magnification (inverted imaging), the positions of the light-emitting elements are inverted in the main scanning direction and the sub-scanning direction. That is, in the configuration shown in FIG. 1, even-numbered light-emitting elements 8, 6, 4, and 2 are arrayed on an upstream side (first row) in the movement direction of an image carrier and odd-numbered light-emitting elements 7, 5, 3, and 1 are arrayed on the downstream side (second row). In addition, a light-emitting element with a large number is arrayed at the head side in the main scanning direction.

Figure 1:
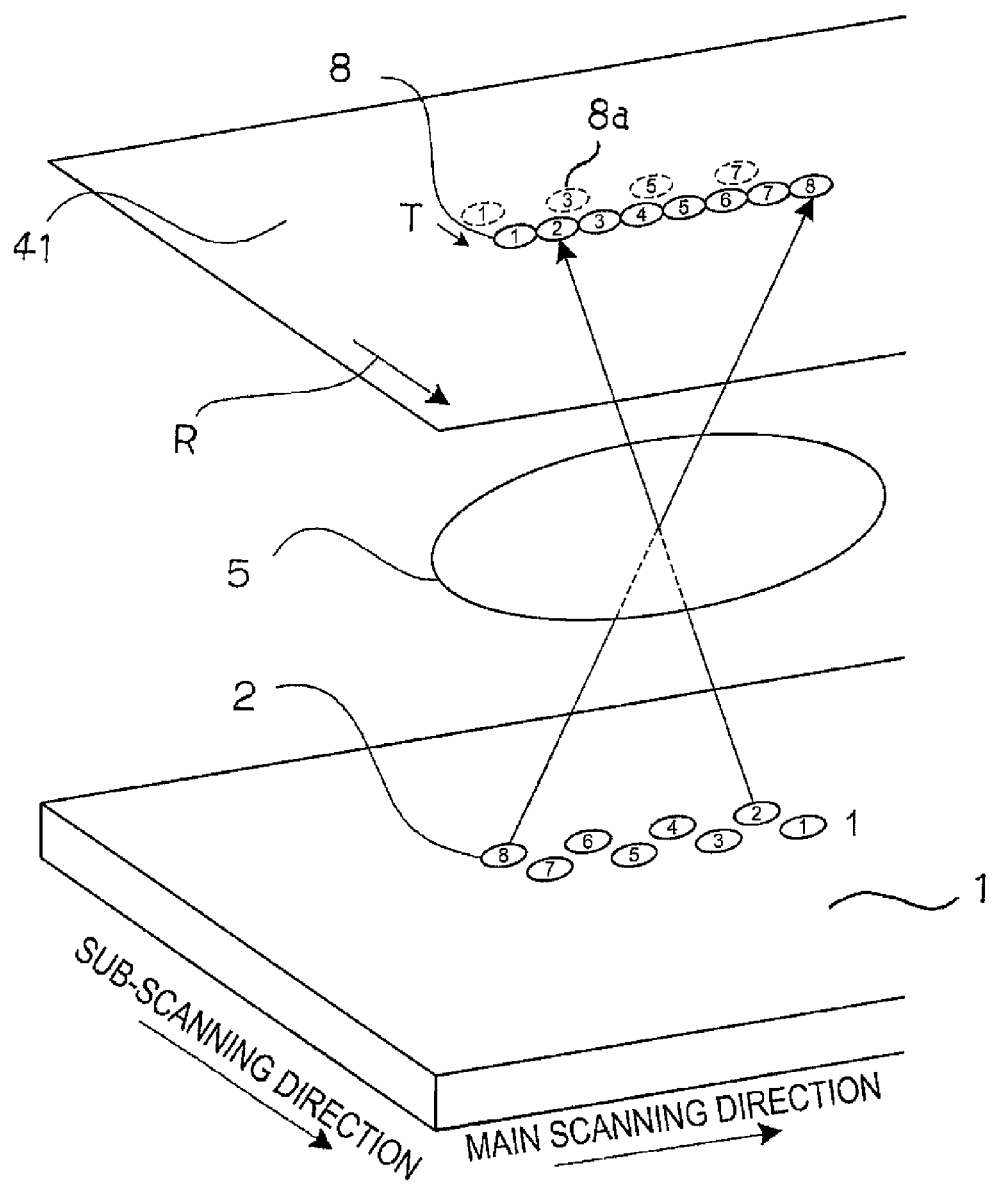
FIG. 1 is a perspective view illustrating a portion corresponding to one microlens of a line head according to an embodiment of the invention.
Figure 2:
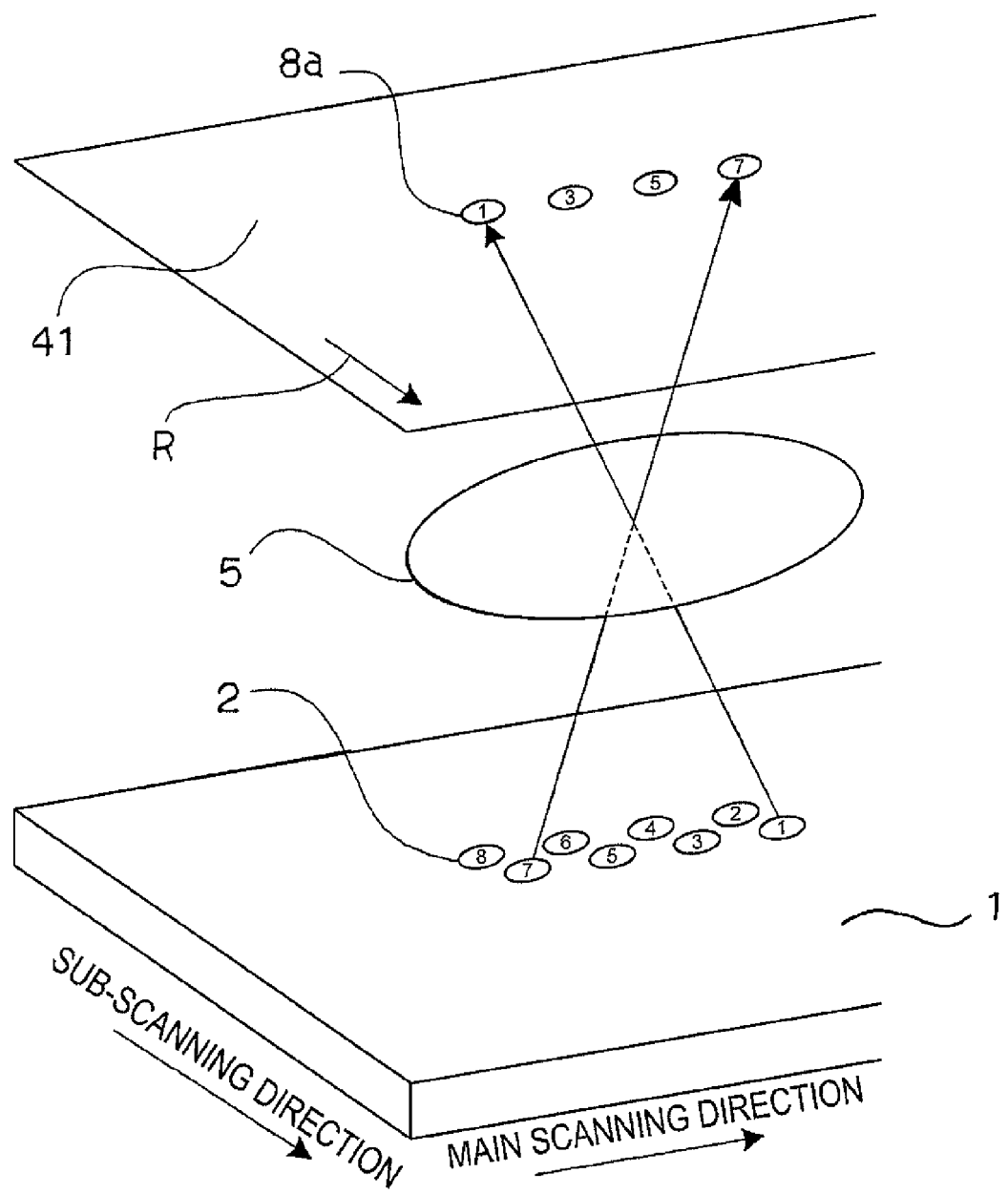
FIG. 2 is a perspective view illustrating a portion corresponding to one microlens of a line head according to an embodiment of the invention.
Figure 3:
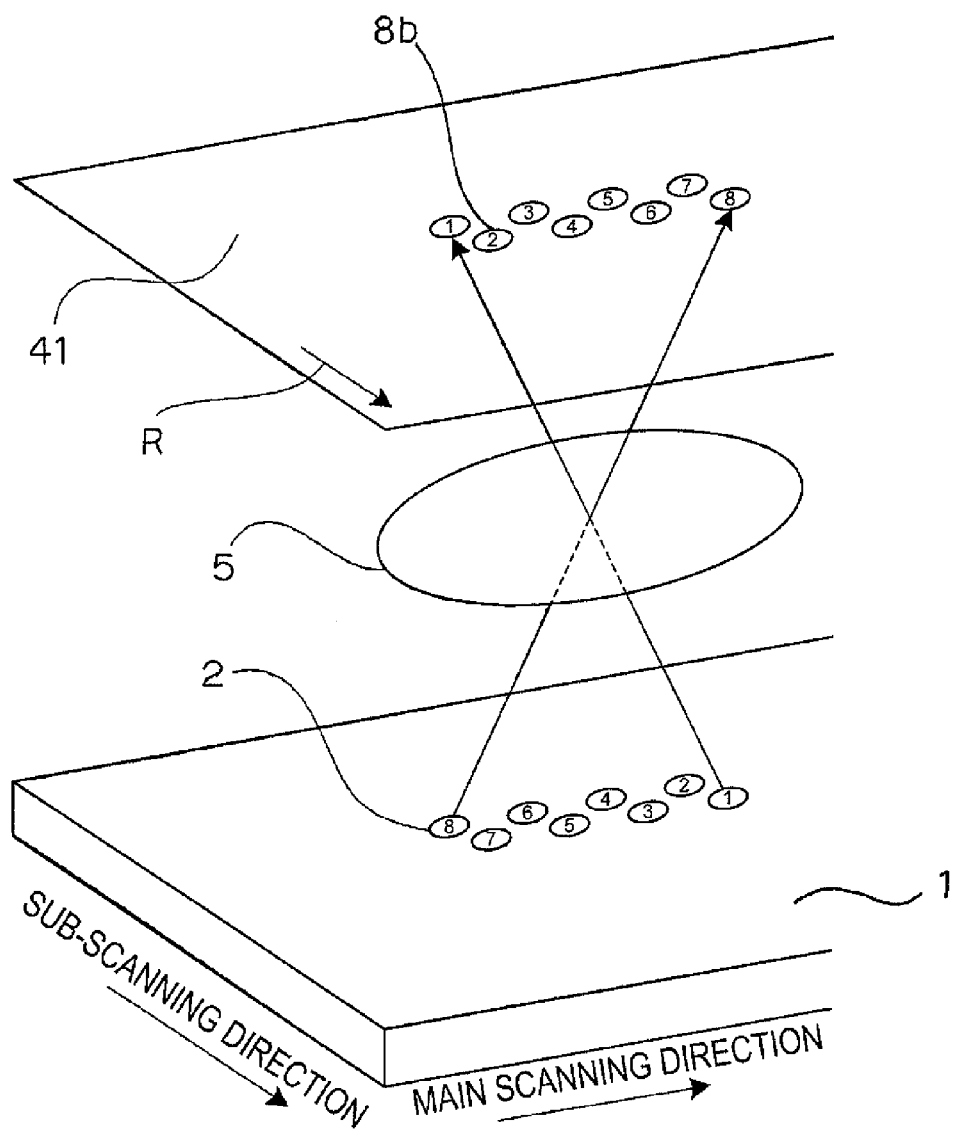
FIG. 3 is a perspective view illustrating a portion corresponding to one microlens of a line head according to an embodiment of the invention.

FIGS. 1 to 3 are perspective views illustrating a portion corresponding to one microlens of the line head according to the present embodiment. As shown in FIG. 2, an imaging spot 8a of an image carrier 41 corresponding to the odd-numbered light-emitting element 2 arrayed on the downstream side of the image carrier 41 is formed at the position inverted in the main scanning direction. 'R' refers to the movement direction of the image carrier 41. Furthermore, as shown in FIG. 3, an imaging spot 8b of the image carrier 41 corresponding to the even-numbered light-emitting element 2 arrayed on the upstream side (first row) of the image carrier 41 is formed at the downstream position inverted in the sub-scanning direction. However, in the main scanning direction, the positions of imaging spots from the head side correspond in order to numbers of the light-emitting elements 1 to 8. Accordingly, in this example, it can be seen that the imaging spots can be formed on the same row in the main scanning direction by adjusting the timing of formation of imaging spots in the sub-scanning direction of the image carrier.

Figure 5:
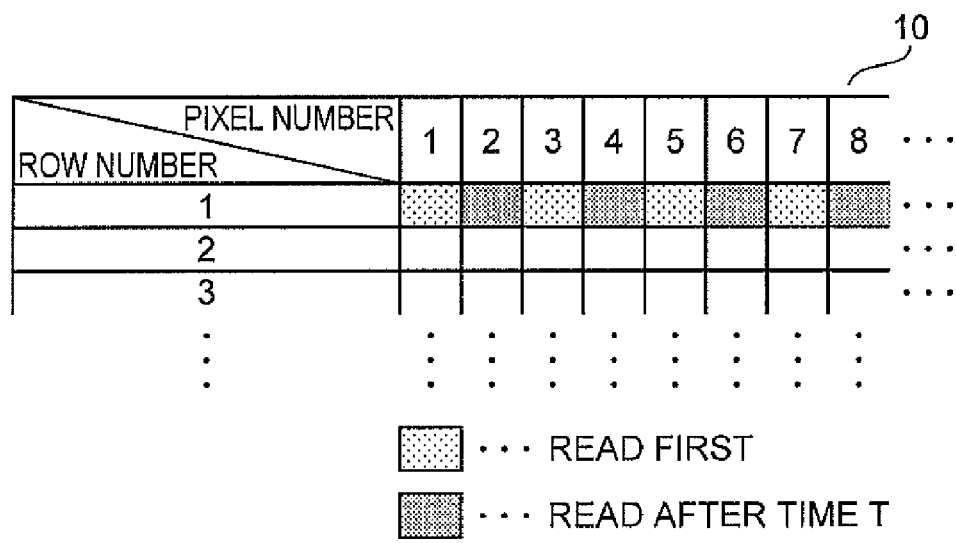
FIG. 5 is an explanatory view illustrating an example of a memory table of a line buffer in which image data is stored.

FIG. 5 is an explanatory view illustrating an example of a memory table 10 of a line buffer in which image data is stored. The memory table 10 shown in FIG. 5 stores the image data therein in a state where the numbers of the light-emitting elements shown in FIG. 4 are inverted in the main scanning direction. Referring to FIG. 5, first image data 1, 3, 5, and 7 corresponding to the light-emitting elements on the upstream side (first row) of the image carrier 41 are first read from the image data stored in the memory table 10 of the line buffer to make the light-emitting elements emit light. Then, after time T has elapsed, second image data 2, 4, 6, and 8 corresponding to the light-emitting elements on the downstream side (second row) of the image carrier 41 stored in the memory address are read to make the light-emitting elements emit light. In this manner, as shown by the position indicated by reference numeral '8' in FIG. 6, the imaging spots on the first row of the image carrier and the imaging spots on the second row are formed on the same row in the main scanning direction.

Figure 6:
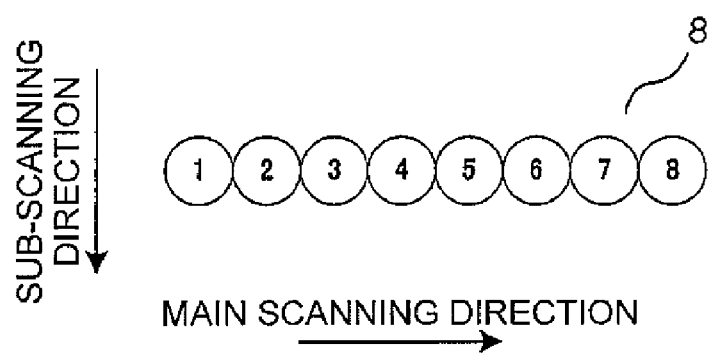
FIG. 6 is an explanatory view illustrating a state where imaging spots are formed on the same row in the main scanning direction by even-numbered light-emitting elements and odd-numbered light-emitting elements.

FIG. 1 is a perspective view conceptually illustrating an example of forming imaging spots by reading image data at the timing shown in FIG. 5. As already described with reference to FIG. 5, the light-emitting elements on the upstream side (first row) of the image carrier 41 are first made to emit light, forming imaging spots on the image carrier 41. Then, the odd-numbered light-emitting elements on the downstream side (second row) of the image carrier 41 are made to emit light after the predetermined time T has passed, forming imaging spots on the image carrier. In this case, the imaging spots formed by the odd-numbered light-emitting elements are not formed at the positions indicated by reference numeral '8a' described in FIG. 2 but are formed at the positions indicated by reference numeral '8' on the same row in the main scanning direction as shown in FIG. 6.

Figure 7:
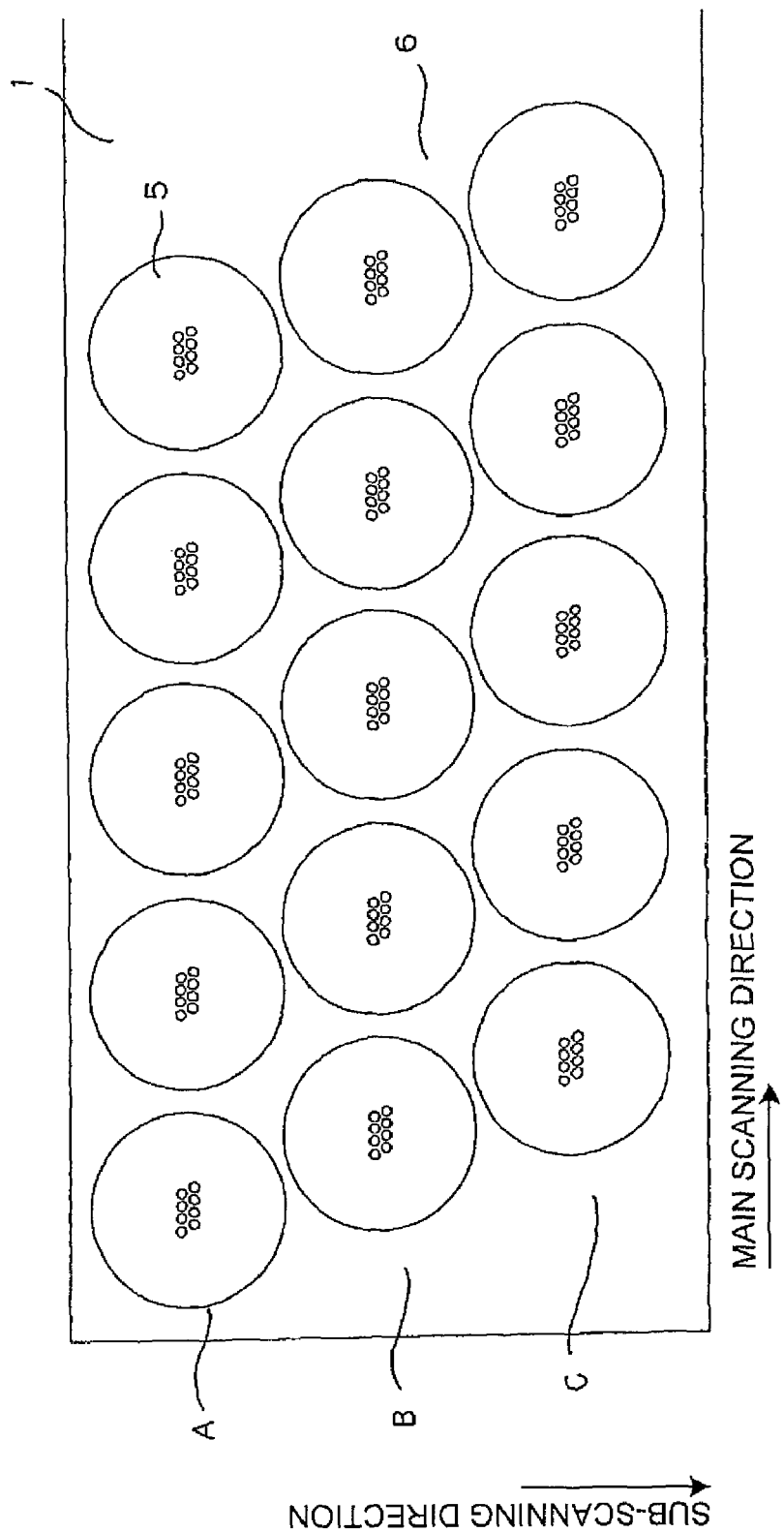
FIG. 7 is an explanatory view schematically illustrating an example of a light emitter array used as a line head.

FIG. 7 is an explanatory view schematically illustrating an example of a light emitter array used as a line head. Referring to FIG. 7, in the light emitter array 1, a plurality of light-emitting element rows 3 each of which has the plurality of light-emitting elements 2 arrayed in the main scanning direction are provided in the sub-scanning direction, such that a light emitter block 4 (refer to FIG. 4) is formed. In the example shown in FIG. 7, two rows of light-emitting element rows 3 each of which has four light-emitting elements 2 arrayed in the main scanning direction are formed in the sub-scanning direction in the light emitter block 4 (refer to FIG. 4). The plurality of light emitter blocks 4 are disposed in the light emitter array 1, and each light emitter block 4 is disposed corresponding to the microlens 5.

The plurality of microlenses 5 are provided in the main scanning direction and sub-scanning direction of the light emitter array 1 to thereby form a microlens array (MLA) 6. In the MLA 6, the head position in the main scanning direction is shifted in the sub-scanning direction. Such arrangement of the MLA 6 corresponds to a case in which the light-emitting elements are provided in the light emitter array 1 in a zigzag shape. In the example shown in FIG. 7, the MLAs 6 are disposed in three rows in the sub-scanning direction, and unit blocks 4 corresponding to the positions of the three rows of the MLAs 6 in the sub-scanning direction are classified into a group A, a group B, and a group C for the convenience of explanation.

As described above, in the case where the plurality of light-emitting elements 2 are disposed in the microlens 5 having minus optical magnification and the plurality of rows of lenses are arranged in the sub-scanning direction, it is necessary to perform the following image data control in order to form imaging spots arrayed in a row in the main scanning direction of the image carrier 41. That is, (1) inversion in the sub-scanning direction, (2) inversion in the main scanning direction, (3) adjustment of light emission timing of a plurality of rows of light-emitting elements in a lens, and (4) adjustment of light emission timing of light-emitting elements between groups are needed.

Figure 8:
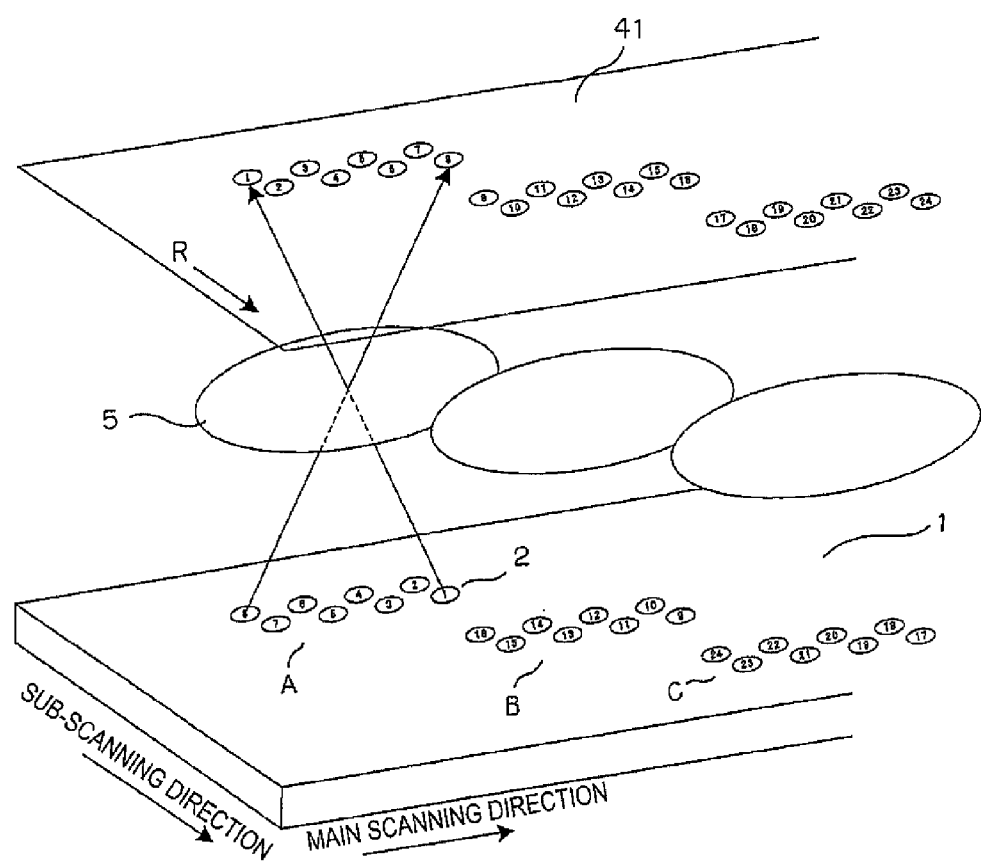
FIG. 8 is an explanatory view illustrating the imaging position when output light of each light-emitting element is irradiated onto an exposure surface of an image carrier through a microlens in the configuration shown in FIG. 7.

FIG. 8 is an explanatory view illustrating the imaging position when output light of each light-emitting element 2 is irradiated onto an exposure surface of an image carrier through the microlens 5 in the configuration shown in FIG. 7. In FIG. 8, the unit blocks 4 classified into the group A, the group B, and the group C are disposed in the light emitter array 1, as described in FIG. 7. Light-emitting element rows of each of the unit blocks 4 of the group A, group BS, and group C are divided into an upstream side (first row) and a downstream side (second row) of the image carrier 41, and even-numbered light-emitting elements are assigned for the first row and odd-numbered light-emitting elements are assigned for the second row.

In the case of the group A, imaging spots are formed at the positions of the image carrier 41 inverted in the main scanning direction and the sub-scanning direction by operating each light-emitting element 2 as already described with reference to FIGS. 1 to 3. In this manner, on the image carrier 41, the imaging spots are formed on the same row in the main scanning direction in the order of 1 to 8. Then, the image carrier 41 is moved in the sub-scanning direction for a predetermined time to execute processing for the group B in the same manner. Then, the image carrier 41 is moved in the sub-scanning direction for a predetermined time to execute processing for the group C. As a result, the imaging spots based on the input image data are formed on the same row in the main scanning direction in the order of 1 to 24.

Figure 9:
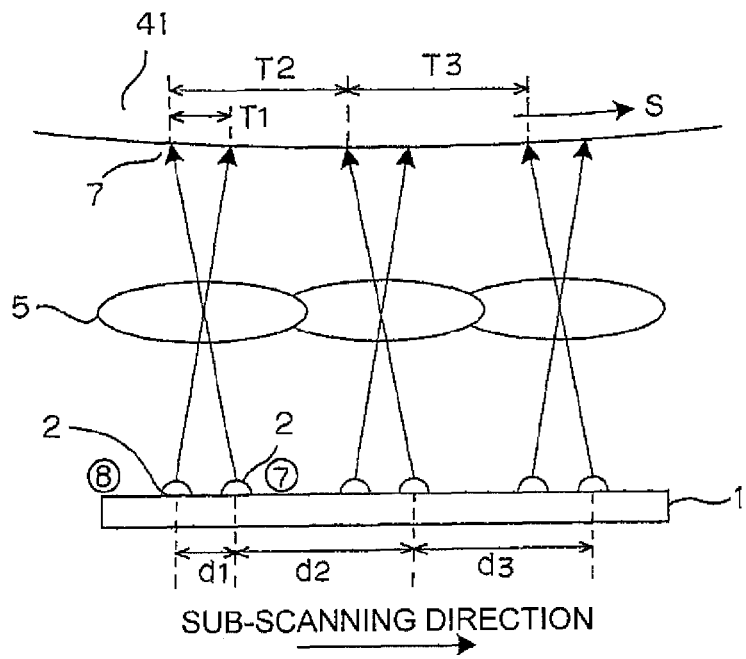
FIG. 9 is an explanatory view illustrating a state of formation of imaging spots in the sub-scanning direction in FIG. 8.

FIG. 9 is an explanatory view illustrating a state of formation of imaging spots in the sub-scanning direction in FIG. 8. S is the movement speed of the image carrier 41, d1 is a distance between light-emitting elements on the first and second rows of the group A, d2 is a distance between a light-emitting element on the second row of the group A and a light-emitting element on the second row of the group B, d3 is a distance between a light-emitting element on the second row of the group B and a light-emitting element on the second row of the group C, T1 is a time until a light-emitting element on the first row emits light after emission of the light-emitting element on the second row of the group A, T2 is a time taken when the imaging position by the light-emitting element on the second row of the group A moves to the imaging position of the light-emitting element on the second row of the group B, and T3 is a time taken when the imaging position by the light-emitting element on the second row of the group A moves to the imaging position of the light-emitting element on the second row of the group C.

T1 can be calculated as follows. T2 and T3 can also be calculated similarly by replacing d1 with d2 and d3.

$$T1 = |(d1 \times \beta)/S|$$

Here, each parameter is as follows.

d1: distance between light-emitting elements in the sub-scanning direction

S: movement speed of an imaging surface (image carrier)

β: magnification of a lens

Figure 10:
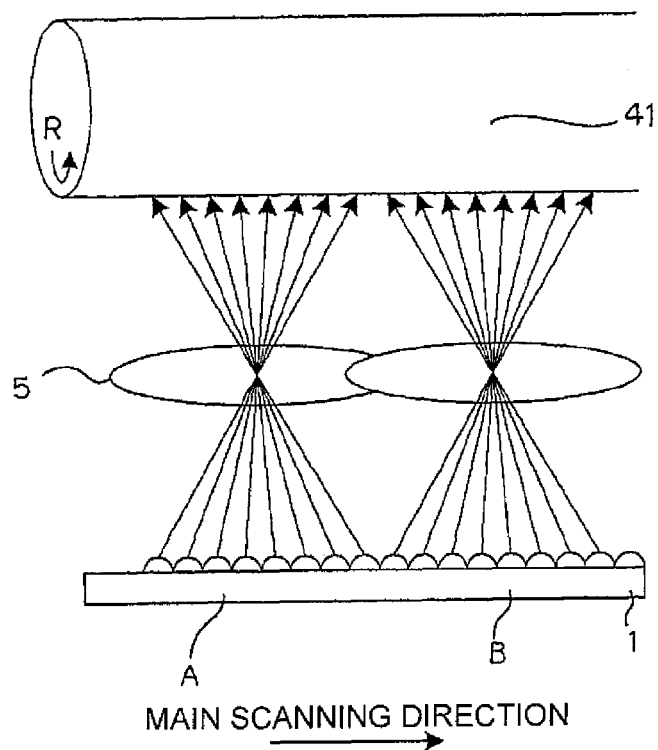
FIG. 10 is an explanatory view illustrating an example where imaging spots are formed to be inverted in the main scanning direction of the image carrier in the case where a plurality of microlenses are arrayed.

In FIG. 9, the light-emitting elements on the second row of the group B are made to emit light after the time T2 for which the light-emitting elements on the second row of the group A emit light. Then, the light-emitting elements on the second row of the group C are made to emit light after the time T3 has elapsed from the time T2. The light-emitting elements on the first row of each group emit light after the time T1 has elapsed since the light-emitting elements on the second row emitted light. By performing such processing, imaging spots, which are formed by light emitters that are disposed in a two-dimensional manner in the light emitter array 1, can be formed in a row on the image carrier as shown in FIG. 8. FIG. 10 is an explanatory view illustrating an example where imaging spots are formed to be inverted in the main scanning direction of the image carrier in the case where the plurality of micro-lenses 5 are arrayed.

Figure 11:
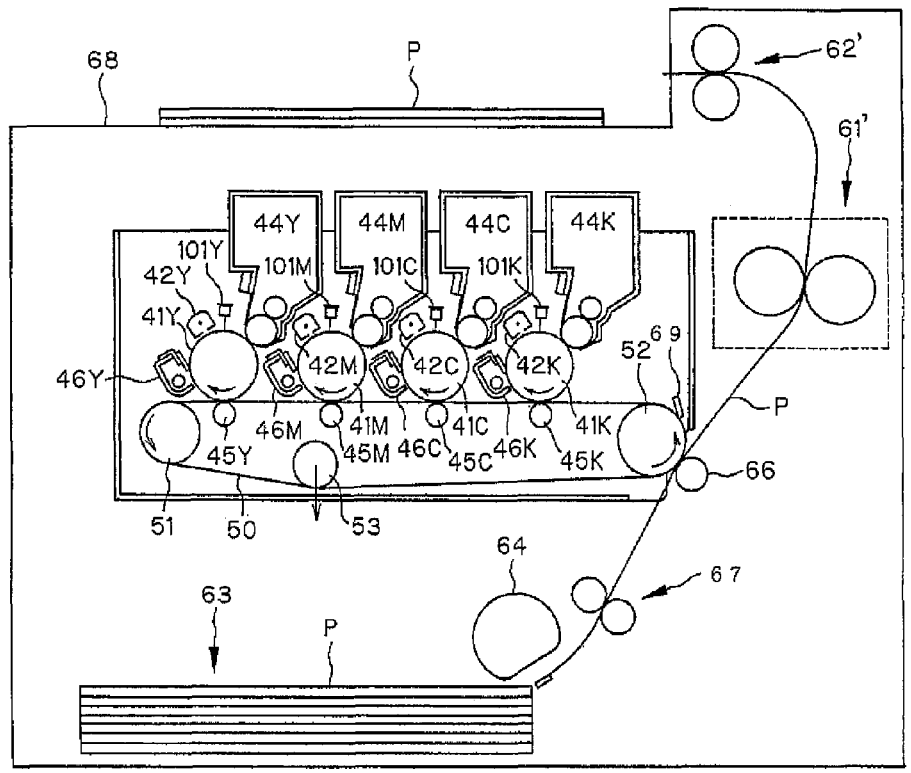
FIG. 11 is a cross-sectional view schematically illustrating the entire configuration of a first example of an image forming apparatus, which uses an electrophotographic process, according to an embodiment of the invention.

An image forming apparatus can be formed by using the above-described line head. In an embodiment, the above-described line head can be used for a tandem-type color printer (image forming apparatus) that exposes four photo-conductors to light with four line heads, forms images corresponding to four colors at the same time, and transfers the images onto one intermediate transfer belt (intermediate transfer medium) having an endless shape. FIG. 11 is a longitudinal sectional side view illustrating an example of a tandem-type image forming apparatus that uses an organic EL element as a light-emitting element. In this image forming apparatus, four line heads 101K, 101C, 101M, and 101Y having the same configuration are arranged at exposure positions of four corresponding photoconductor drums (image carriers) 41K, 41C, 41M, and 41Y having the same configuration. The image forming apparatus is configured as a tandem type image forming apparatus.

As shown in FIG. 11, the image forming apparatus includes a driving roller 51, a driven roller 52, a tension roller 53, and an intermediate transfer belt (intermediate transfer medium) 50 which is suspended by tension applied by the tension roller 53 and is driven to rotate in the direction (counterclockwise direction) indicated by the arrows shown in the drawing. Photoconductors 41K, 41C, 41M, and 41Y, which serve as four image carriers and each of which has a photosensitive layer on the outer peripheral surface thereof, are arranged at predetermined gaps from the intermediate transfer belt 50.

The letters K, C, M, and Y appended to the ends of the reference numerals stand for black, cyan, magenta, and yellow, respectively, which indicate photoconductors for black, cyan, magenta, and yellow. The same is true for other members. The photoconductors 41K, 41C, 41M, and 41Y are driven to rotate in the direction (clockwise rotation), which is indicated by the arrow shown in the drawing, in synchronization with driving of the intermediate transfer belt 50. A charging unit (corona charger) 42(K, C, M, Y) for uniformly charging the outer peripheral surface of each photoconductor drum 41(K, C, M, Y) and the above-described line head 101(K, C, M, Y) according to the embodiment of the invention for sequentially scanning the outer peripheral surface, which is charged uniformly by the charging unit 42(K, C, M, Y), in synchronization with rotation of the photoconductor drum 41(K, C, M, Y) are provided on the periphery of each photoconductor drum 41(K, C, M, Y).

In addition, there is further provided a developing unit 44(K, C, M, Y) for applying toner, serving as a developing agent, onto an electrostatic latent image formed by the line head 101(K, C, M, Y) in order to convert the image into a visible image (toner image), a primary transfer roller 45(K, C, M, Y) serving as a transfer unit that sequentially transfers the toner image developed by the developer 44(K, C, M, Y) onto the intermediate transfer belt 50 which is an object to be primarily transferred, and a cleaner 46(K, C, M, Y) serving as a cleaning unit that removes toner that remains on the surface of the photoconductor drum 41(K, C, M, Y) after transferred.

Here, each line head 101(K, C, M, Y) is provided such that the arrayed direction of the line head 101(K, C, M, Y) is aligned with a generating line of each photoconductor drum 41(K, C, M, Y). In addition, the peak wavelength of light emission energy of each line head 101(K, C, M, Y) and the peak wavelength of sensitivity of each photoconductor drum 41(K, C, M, Y) are set to be approximately equal to each other.

The developing unit 44(K, C, M, Y) uses single-nonmagnetic-component toner as the developing agent, for example. The single-component developing agent is transported to a developing roller by a feeding roller, for example, the film thickness of the developing agent attached to the surface of the developing roller is regulated by a regulating blade, and the developing roller is brought into contact with or pressed against the photoconductor drum 41(K, C, M, Y) to cause the developing agent to be adhered thereto depending on the electrical potential level of the photoconductor drum 41(K, C, M, Y). A toner image is thus developed.

The four toner images of black, cyan, magenta, and yellow formed by the four single-color toner image forming stations are primary-transferred sequentially onto the intermediate transfer belt 50 by a primary transfer bias applied to each of the primary transfer rollers 45(K, C, M, Y). Then, a full-color toner image formed by sequentially superimposing these single-color toner images on the intermediate transfer belt 50 is secondary-transferred onto a recording medium P, such as paper, by a secondary transfer roller 66. The secondary-transferred image is then fixed on the recording medium P after passing through a fixing roller pair 61' that is a fixing unit, and the recording medium P is ejected onto a paper discharging tray 68 provided at the top of the apparatus by a paper discharging roller pair 62'.

Moreover, in FIG. 11, reference numeral 63 denotes a paper feeding cassette having a number of recording media P laminated and held thereon, and reference numeral 64 denotes a pick-up roller for feeding the recording media P from the paper feeding cassette 63 one by one. Reference numeral 65 denotes a gate roller pair for regulating the timing of feeding of the recording medium P to the secondary transfer portion of the secondary transfer roller 66, reference numeral 66 is a secondary transfer roller serving as a secondary transfer unit that forms a secondary transfer portion together with the intermediate transfer belt 50, and reference numeral 67 denotes a cleaning blade serving as a cleaning unit that removes toner remaining on the surface of the intermediate transfer belt 50 after the secondary transfer.

The invention relates to an optical system of the above-described line head (optical writing line head).

First, an image-side angle of aperture when the light source intensity of the light-emitting element 2, the sensitivity characteristic of the image carrier 41, the resolution of the image forming apparatus, and the light transmission efficiency of the microlens 5 are given will be considered.

Assuming that each light-emitting element 2 is a light source 2 and the light source 2 is sufficiently small compared with a distance up to the microlens 5, the light source 2 will be considered as a uniform point light source. That is, the light source intensity I is expressed as follows.

$$I = I_O (= \text{constant}) \quad (1)$$

Figure 12:
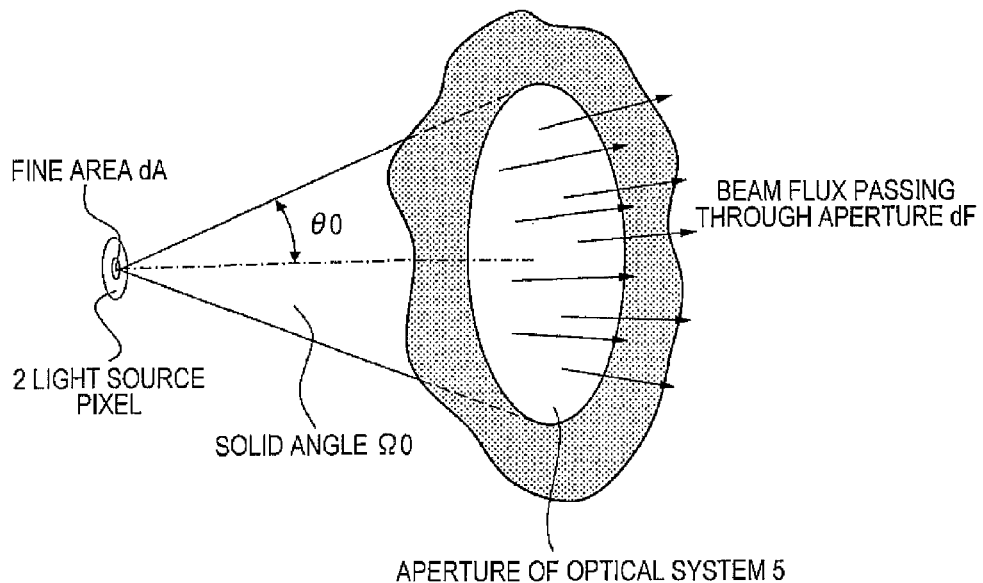
FIG. 12 is a view explaining light flux that is emitted from one light source and is incident on an aperture of an optical system.

Assuming that light flux, which is emitted from a fine area dA of a light-emitting portion of the light source (pixel) 2 and is incident on an aperture of the optical system (microlens) 5, is dF and a light-source-side solid angle of dF is $\Omega_O$ as shown in FIG. 12, the following expression (2) is obtained.

$$dF = \int I d\Omega = I_O \Omega_O \quad (2)$$

Here, assuming that an angle between a middle light beam and a generating line of an outer peripheral surface of the conical shaped dF immediately after the light source 2 is $\theta_O$, the following expression (3) is obtained.

$$\Omega_O = 2\pi\{1 - \cos(\theta_O)\} = 4\pi\{\sin(\theta_O/2)\}^2 \quad (3)$$

Substituting the expression (3) into the expression (2), the following expression (4) is obtained.

$$dF = 4\pi I_O \{\sin(\theta_O/2)\}^2 \quad (4)$$

Assuming that the radius of the light source 2 is $R_O$, light flux $F_O$ incident on an optical system per dot (one light-emitting element 2) is expressed as follows.

$$F_O = \int dF dA = 4\pi^2 I_O R_O^2 \{\sin(\theta_O/2)\}^2 \quad (5)$$

Assuming that the light transmittance of the optical system (microlens) 5 is $\eta_{lens}$, light flux $F_i$ per dot (imaging spot 8 corresponding to one light-emitting element 2) on image surface (image carrier) 41 is expressed as follows.

$$F_i = \eta_{lens} F_O \quad (6)$$

Assuming that the lateral magnification of the optical system (microlens) 5 is $\beta$, a convergence angle of image surface light flux $\theta_i$ and an image surface spot diameter $R_i$ are expressed as follows.

$$\theta_i = \theta_O / |\beta| \quad (7)$$

$$R_i = |\beta| R_O \quad (8)$$

In addition, taking a paraxial analysis into consideration, the following expression (9) is obtained.

$$\sin(\theta_O/2) = \theta_O/2 \quad (9)$$

Substituting the expressions (5), (7), (8), and (9) into the expression (6) for rearrangement, the following expression (10) is obtained.

$$F_i = 4\pi^2 \eta_{lens} I_O (R_i/|\beta|)^2 \cdot (|\beta|\theta_i/2)^2 = \pi^2 \eta_{lens} I_O R_i^2 \theta_i^2 \quad (10)$$

Solving this expression for $\theta_i$, the following expression (11) is obtained.

$$\theta_i = \{(F_i/\pi^2 \eta_{lens} I_O R_i^2)\}^{0.5} \quad (11)$$

$F_i$ is an image surface light amount decided from the sensitivity characteristic of the image carrier 41, $I_O$ is the luminous intensity of the light source (light-emitting element) 2, $R_i$ is an image surface spot diameter decided from the resolution of an image forming apparatus, and $\eta_{lens}$ is a value decided from the number of lens surfaces of the microlens 5 or a material of the microlens 5. Each of them is a parameter decided independently.

The expression (11) indicates that the image-side angle of aperture (half angle) $\theta_i$ is decided if $F_i$, $I_O$, $R_i$, and lens are decided.

In the invention, it is assumed that the microlens 5 included in the microlens array 6 is formed by using a lens system configured to include two positive lenses disposed on the same axis and an aperture diaphragm is positioned at a front-side focal position of the microlens 5 located at the object side (side of the light-emitting element 2) of the two positive lenses to thereby obtain an arrangement in which the image side is telecentric. Thus, a degree of freedom in correction of aberration and the like are improved by forming the microlens 5 with two positive lenses. In addition, by adopting the configuration in which the image side is telecentric, the positional deviation of an imaging spot corresponding to the light-emitting element 2 of the light emitter block 4 on the photoconductor 41, which occurs when a surface of the photoconductor (image surface) 41 that is an image surface moves forward and backward in the direction of an optical axis of a lens due to deflection of a photoconductor or the like, does not occur. As a result, unevenness in the pitch between scanning lines drawn by relative movement of the imaging spot in the sub-scanning direction (pitch unevenness of an imaging spot in the main scanning direction) does not occur.

In the invention, it is necessary to suppress the required effective diameter of each lens small in order to make the diameter of the microlens 5 small. When the image-side angle of aperture (half angle) $\theta_i$ is decided by the expression (11), a distance from the second lens (image-side positive lens) of the two positive lenses, which form the microlens 5, to an image surface 41 is decided in an optical system in which an image side is telecentric. In addition, the required effective diameter of the second lens is set when the width of an image surface pixel group in the main scanning direction is decided. However, these two parameters cannot be set freely but are decided in consideration of restriction, such as interference between the microlens 5 and the photoconductor 41 or interference between adjacent microlenses arrayed in the shape of an array. It is a condition of preventing the diameter of the microlens 5 from becoming large to make the effective diameter required for the first lens (object-side positive lens) equal to or smaller than that required for the second lens after the diameter of the second lens is set.

Hereinafter, a condition in which the effective diameter of the first lens that forms each microlens 5 becomes equal to or smaller than the effective diameter of the second lens will be examined, and then a condition of suppressing the effective diameter of the second lens small will be examined.

Figure 13:
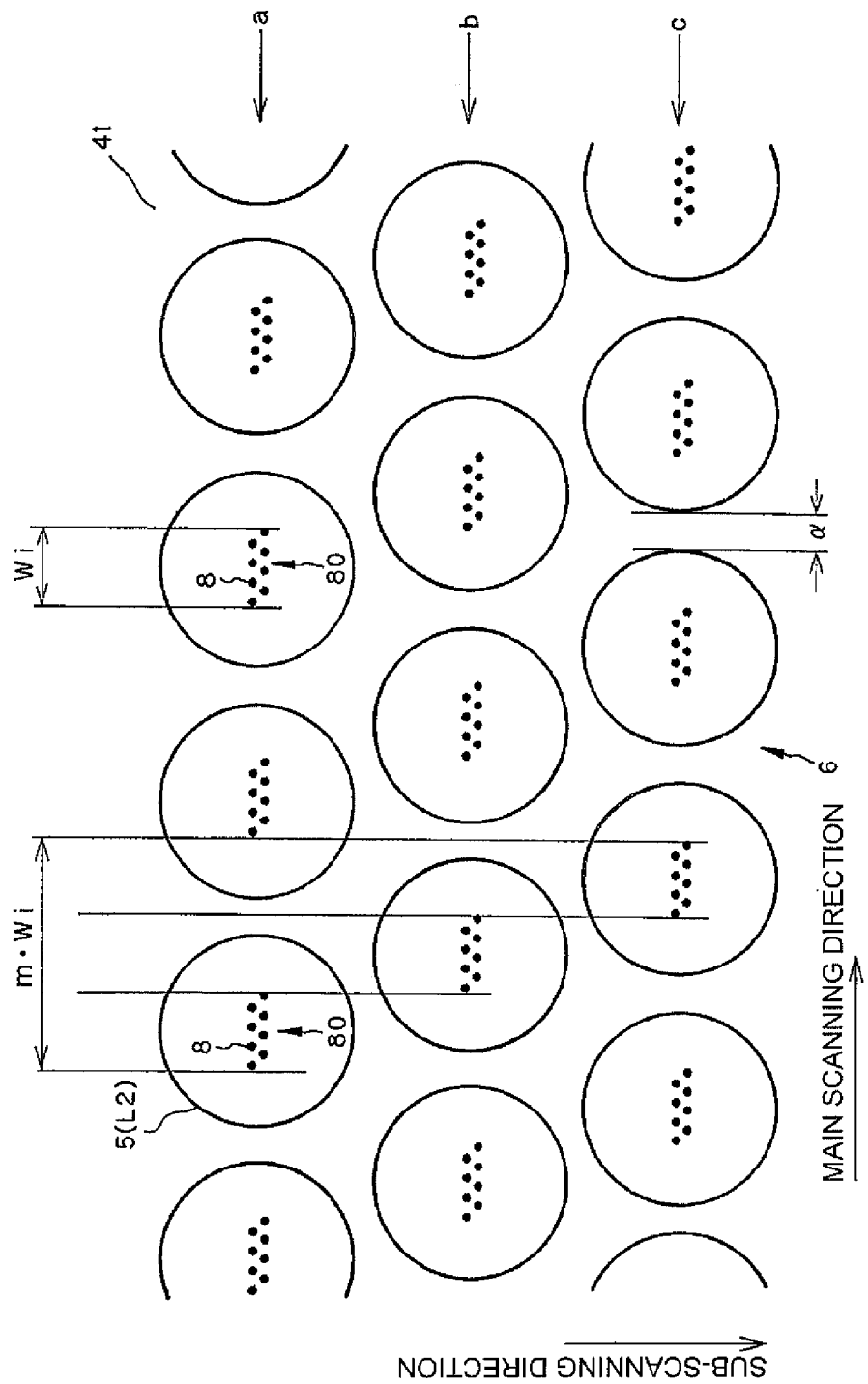
FIG. 13 is a view illustrating the relationship between a group of imaging spots, which is an image of a light-emitting element on an image surface, and a microlens corresponding thereto.

Here, terms are defined. FIG. 13 is a view illustrating the relationship between a group (corresponding to an image of the light emitter block 4) 80 of imaging spots 8, which is an image of the light-emitting element 2 on the image surface (image carrier) 41, and the microlens 5 corresponding to the group 80 of each imaging spot 8. In the case shown in FIG. 13, in the microlens array 6 having the microlens 5 as a constituent element, lens rows a, b, and c in which the plurality of microlenses 5 are arrayed in the main scanning direction are disposed in parallel in the sub-scanning direction and the number m of lens rows is 3. In this case, light emitter block rows A, B, and C in which the plurality of light emitter blocks 4 are arrayed in the main scanning direction are also three rows corresponding to that described above (FIG. 7). In addition, phases of repeated pitches in the main scanning direction of the lens rows a, b, and c of the microlenses 5 and the rows A, B, and C of the light emitter blocks deviate from each other by 1/m of the adjacent lens rows and light emitter block rows. In the case of this example, the phases deviate from each other by 1/3.

It is assumed that the group 80 of the imaging spots 8 is image surface pixel group, a group of the light-emitting elements 2 of the light emitter block 4 corresponding thereto is a light source pixel group. In addition, as shown in FIG. 13, it is assumed that the width of the image surface pixel group 80 in the main scanning direction is $W_i$, the width of the light source pixel group in the main scanning direction is $W_O$, and a gap between an effective region, which exists at the inner side of the effective diameter of the image-side second lens L2 of the two positive lenses that form the microlens 5, and an effective region of the other lens adjacent to the lens in the main scanning direction is α (strictly speaking, a gap between effective regions of the second lens L2 even though the gap α between effective regions is shown as a gap between effective regions of the microlens 5 in FIG. 13).

A condition in which the effective diameter of the first lens L1 becomes equal to or smaller than the effective diameter of the second lens L2 is calculated on the basis of the paraxial equation before and after the second lens L2.

Figure 14:
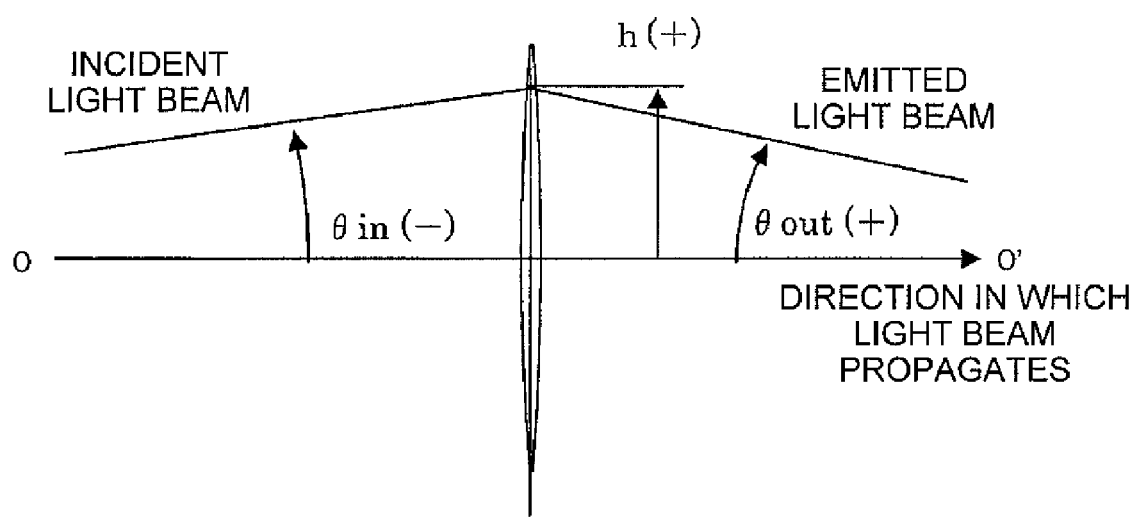
FIG. 14 is a view illustrating the definition of reference numerals of parameters.

First, reference numerals of parameters are defined as shown in FIG. 14. That is, a clockwise direction is positive for an angle θ measured from the optical axis O-O', an upper side is positive for an image height h measured from the optical axis O-O', and a rightward direction (direction in which a light beam propagates) is positive for a distance on the optical axis O-O'. In addition, a lowercase letter 'in' after reference numeral means an object-side parameter, and a lowercase letter 'out' after reference numeral means an image-surface-side parameter.

Figure 15:
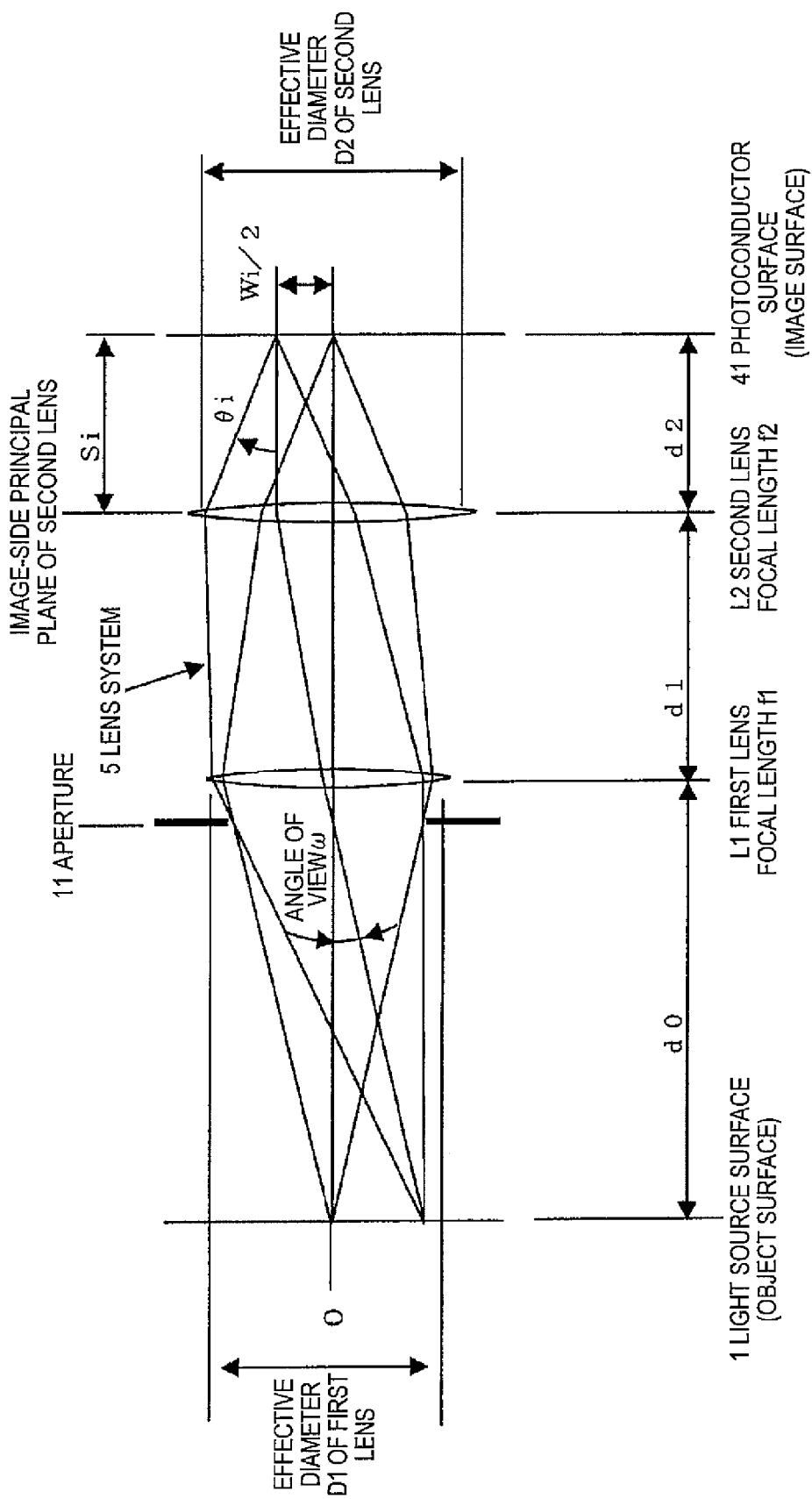
FIG. 15 is a view for calculating a condition in which the effective diameter of a first lens becomes equal to or smaller than that of a second lens.

First, referring to FIG. 15, when the effective diameter of a lens is assumed to be a maximum beam passage height on a lens, it is preferable that a light beam, which is farthest from an optical axis on an incident surface of the second lens L2, among the light flux formed on an end pixel of the image surface pixel group 80 be approximately parallel to the optical axis in order that the effective diameter of the first lens L1 becomes approximately equal to that of the second lens L2. A paraxial equation before and after the second lens L2 is obtained on the basis of the above condition. Assuming that an angle between a light beam incident on the second lens L2 and an optical axis O-O' is $\theta_{2in}$, an angle between a light beam outgoing from the second lens L2 and the optical axis O-O' is $\theta_{2out}$, a light beam passage height on the second lens L2 is $h_2$, and a focal length of the second lens L2 is $f_2$, the following expression (12) is obtained.

$$\theta_{2out} = \theta_{2in} + h_2/f_2 \tag{12}$$

Since the lens system (microlens) 5 is telecentric on the image side (aperture diaphragm 11 is positioned on a front-side focal surface of the lens system 5) and $\theta_{2out} = \theta_i$ because light beams converge at the image-side angle of aperture (half width) $\theta_i$, the following expression (13) is obtained.

$$\theta_i = \theta_{2in} + h_2/f_2 \tag{13}$$

Here, since the incident light beam is parallel to the optical axis O-O', $\theta_{2in} = 0$. In addition, since the lens passage height of the outermost light beam is an effective diameter (radius) of a lens, the above expression (13) is changed to the following expression (14) assuming that the effective diameter of the second lens L2 is $D_2$.

$$\theta_i = 0 + (D_2/2)/f_2 \tag{14}$$

Solving this expression for $f_2$, the following expression (15) is obtained.

$$f_2 = D_2/(2\theta_i) \tag{15}$$

The expression (15) is a conditional expression in which a light beam incident on the second lens L2 is parallel to the optical axis O-O', that is, the effective diameter of the first lens L1 becomes equal to that of the second lens L2.

In the case when $f_2$ is smaller than a right side of the expression (15), the angle $\theta_{2in}$ between a light beam incident on the second lens L2 and the optical axis becomes negative from the expression (13). Since this means that the light beam becomes farther from the optical axis O-O' as the light beam propagates, the effective diameter of the first lens L1 may be set smaller. Accordingly, the following expression (16) is obtained on the basis of a condition in which the effective diameter of the first lens L1 is approximately equal to or smaller than that of the second lens.

$$f_2 \leq D_2/(2\theta_i) \tag{16}$$

Assuming that a distance from a rear-side principal plane of the second lens L2 to the image surface 41 is $S_i$, the width (full width) of the image surface pixel group 80 on the image surface 41 is $W_i$, the number of lens rows in the main scanning direction of the microlens array 6 that are arrayed in the sub-scanning direction is m, and the effective diameter of the second lens L2 is $D_2$, an allowable range of $W_i$ in configuring lens rows is calculated and a condition of suppressing the required effective diameter of the second lens L2 small will be examined.

Even though a lens pitch within a lens row is expressed as '$mW_i$' (FIG. 13), a lens array (lens rows) cannot be arrayed if the lens pitch is not larger than the effective diameter of the second lens L2. Accordingly, the following expression (17) is obtained.

$$mW_i \geq D_2 \tag{17}$$

In manufacturing a lens array, clearance may be needed in the effective diameter of the adjacent lenses 5 within a lens row. When a (positive number) (FIG. 13) is added as the clearance to the expression (15), the following expression (18) is obtained.

$$mW_i \geq D_2 + \alpha \tag{18}$$

Solving the expressions (16) and (18) for $D_2$, the following expressions (19) and (20) are obtained.

$$2\theta_i f_2 \leq D_2 \tag{19}$$

$$D_2 \leq mW_i - \alpha \tag{20}$$

Solving the expressions (19) and (20) for $f_2$ through $D_2$, the following expression (21) is obtained.

$$f_2 \leq (mW_i - \alpha)/(2\theta_i) \tag{21}$$

Next, the effective diameter $D_2$ of the second lens will be examined. The effective radius of a lens should be larger than the beam height on a lens of beam flux converging on an end pixel of the image surface pixel group 80. Since the image side is telecentric, the following expression (22) is obtained.

$$D_2/2 \geq W_i/2 + S_i\theta_i \tag{22}$$

Multiplying both sides of the expression (22) by 2, the following expression (23) is obtained.

$$D_2 \geq W_i + 2S_i\theta_i \tag{23}$$

Figure 16:
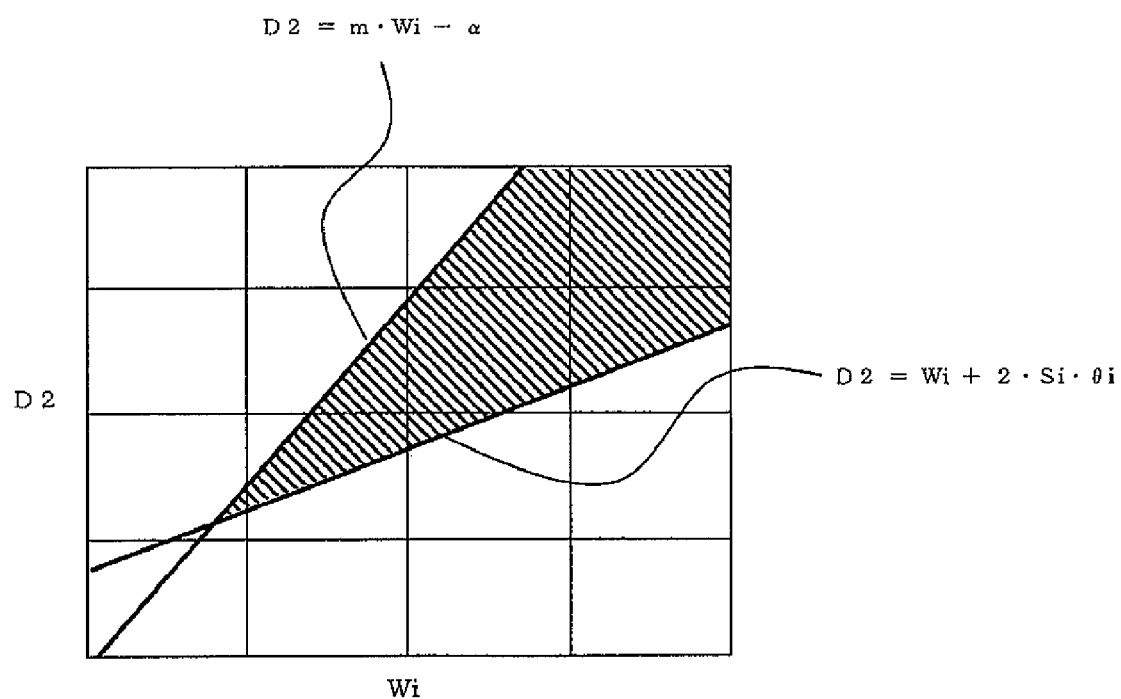
FIG. 16 is a view illustrating a range where the width of an image surface pixel group and the effective diameter of a second lens are satisfied.

Plotting the expression (23) and the expression (20) obtained earlier in a condition where a horizontal axis is $W_i$ and a vertical axis is $D_2$, a result shown in FIG. 16 is obtained. A range indicated by a hashed line of FIG. 16 satisfies both the expressions (20) and (23).

By calculating the intersection between two straight lines of FIG. 16 expressed by the expressions (20) and (23) and then calculating the range of $W_i$ corresponding to the hashed line portion, the following expression (24) is obtained.

$$W_i \geq 2S_i\theta_i/(m-1) + \alpha/(m-1) \tag{24}$$

The expression (24) is a condition allowing the second lens L2 to be disposed in a row shape. If this condition is not satisfied, effective ranges of adjacent lenses interfere each other.

By making the expression (24) satisfied and setting the focal length $f_2$ of the second lens according to the expression (21), the effective diameter of the first lens L1 can be set approximately equal to or smaller than the upper limit of the effective diameter $D_2$ of the second lens set on the basis of the expression (20).

It can be seen from FIG. 16 that the image surface pixel group width $W_i$ is preferably made small in order to make the effective diameter $D_2$ of the second lens as small as possible. That is, the effective diameter $D_2$ of the second lens can be minimized by setting $W_i$ by the following expression obtained by using an equal sign in the expression (24).

$$W_i = 2S_i\theta_i/(m-1) + \alpha/(m-1) \quad (24)'$$

Here, rearranging the expressions (20) and (23) and eliminating $W_i$ in order to calculate an allowable range of the effective diameter $D_2$ of the second lens, the following expression (25) is obtained.

$$D_2 \geq 2S_i\theta_i m/(m-1) + \alpha/(m-1) \quad (25)$$

Even though $\alpha$ is set as the clearance needed in manufacturing a lens array, it is preferable that $\alpha$ be smaller than in the expression (25) since the lower limit of the effective diameter $D_2$ of the second lens becomes small. As more ideal conditions, the following expressions (26) and (27) are obtained by substituting $\alpha=0$ into the expressions (21) and (24). In the case when the clearance is not needed in the effective diameter of the adjacent lens, it is prevented that the effective diameter of the first lens L1 becomes larger than the effective diameter of the second lens L2 by setting $W_i$ according to the expression (27) and setting the focal length $f_2$ of the second lens according to the expression (26). In this way, the lens system 5 can be disposed in the array shape.

$$f_2 \leq mW_i/(2\theta_i) \quad (26)$$

$$W_i \geq 2S_i\theta_i/(m-1) \quad (27)$$

In order to make the effective diameter $D_2$ of the second lens as small as possible, it is preferable to set $W_i$ by the following expression obtained by using an equal sign in the expression (27).

$$W_i = 2S_i\theta_i/(m-1) \quad (27)'$$

Figure 17:
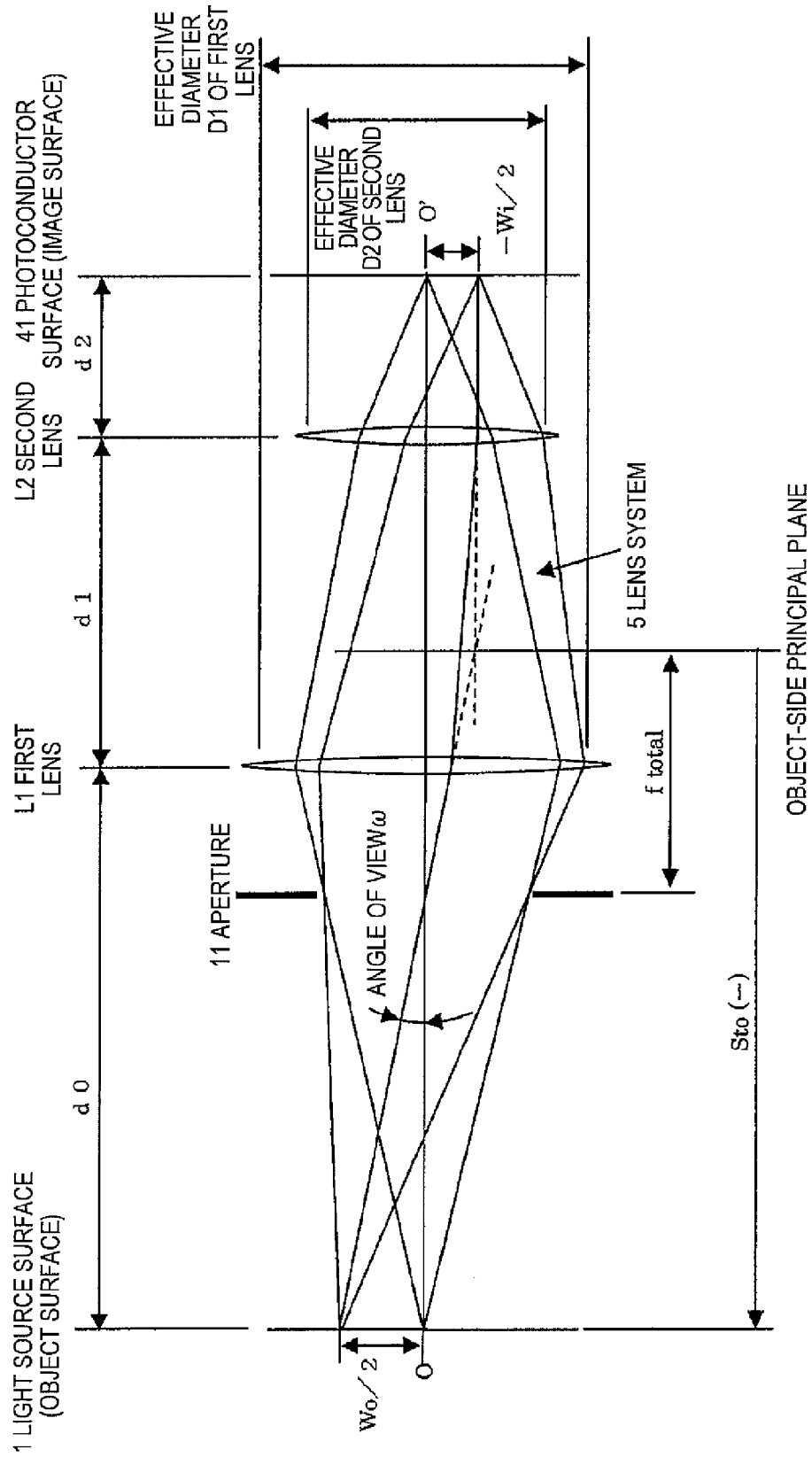
FIG. 17 is a view for performing a paraxial analysis on an angle of view.

Next, an angle of view will be examined. According to a fourth power of cosine rule, the brightness of an off-axis image decreases as an angle (angle of view) between a main light beam of incident light flux and an optical axis becomes large. In other words, it is effective to make an angle of view small in order to suppress shading small. A paraxial analysis on an angle of view is performed with reference to FIG. 17.

Assuming that the lateral magnification of the lens system 5 is $\beta(-)$, the light source pixel group width is $W_O$, and the image surface pixel group width is $W_i$, the following expression (28) is obtained.

$$-W_i = \beta W_O \quad (28)$$

Assuming that a distance between a front-side principal plane of the lens system 5 and the light source (light emitter array) 1 is $St_O$ and a distance between a rear-side principal plane of the lens system 5 and the image surface 41 is $St_i$, the following expression (29) is obtained.

$$St_i = \beta St_O \quad (29)$$

Assuming that a composite focal length of the lens system 5 is $f_{total}$, the following expression (30) is obtained by the paraxial equation.

$$1/S_{ti} = 1/S_{tO} + 1/f_{total} \quad (30)$$

Solving this expression for $S_{tO}$, the following expression (31) is obtained.

$$S_{tO} = S_{ti}f_{total}/(f_{total} - S_{ti}) \quad (31)$$

In addition, assuming that an angle between a middle light beam of the incident light flux and the optical axis O-O' is $\omega$, the following expression (32) is obtained.

$$W_O/2 = -(S_{tO} + f_{total})\omega \quad (32)$$

Eliminating $\beta$ and $W_O$ from the expression (32) using the expressions (28) and (29) and solving the result for $\omega$, the following expression (33) is obtained.

$$\omega = (W_i S_{tO}/2S_{ti})/(S_{tO} + f_{total}) \quad (33)$$

Substituting the expression (31) into the expression (33) for rearrangement, the following expression (34) is obtained.

$$\omega = W_i/(2f_{total}) \quad (34)$$

From the expression (34), it can be seen that $W_i$ is preferably set as small as possible and $f_{total}$ is preferably set as large as possible in order to suppress the angle of view $\omega$ small. $W_i$ can be set to be the lower limit by the expression $(24)'$ or $(27)'$.

Next, $f_{total}$ will be examined. $f_{total}$ is a composite focal length of the two positive lenses L1 and L2 and is expressed by the following expression (35) assuming that a focal length of the first lens L1 is $f_1$, a focal length of the second lens L2 is $f_2$, and a lens gap (distance between a rear-side principal plane of the first lens and a front-side principal plane of the second lens in the case of a thick lens) is $d_1$ $(>0)$ $$f_{total} = f_1 f_2/(f_1 + f_2 - d_1) \quad (35)$$

Noting $d_1$ of the expression (35), $f_{total}$ becomes a large value as $d_1$ is set as large as possible in a condition of $(f_1 + f_2) \geq d_1$. As a result, the angle of view $\omega$ given in the expression (34) can be made small.

In the case when the arrangement of the diaphragms 11 is limited to a side of the light source side rather than the first lens L1 due to the structural restriction and the like (FIGS. 15 and 17), the lens gap $d_1$ is limited to a range of $0 \leq d_1 \leq f_2$ in order that the image side is telecentric and $d_1$ is set to a value close to $f_2$ in order to make the angle of view $\omega$ small. At this time, a gap between the diaphragms 11 disposed on front-side focal surfaces of the two lenses L1 and L2 and the incident surface of the first lens L1 becomes close to zero. That is, this means that the diaphragm 11 and the first lens L1 are disposed adjacent to each other.

In addition, substituting $d_1 = f_2$ into the expression (35) as an ideal condition, the following expression (36) is obtained.

$$f_{total} = f_2 \quad (36)$$

The angle of view $\omega$ is expressed as follows by the expressions (34) and (36).

$$\omega = W_i/(2f_2) \quad (37)$$

Furthermore, substituting the right side of the expression (26) into $f_2$ of the expression (37) as the upper limit of $f_2$, the following expression (38) is obtained as an ideal value at which the angle of view becomes smallest.

$$\omega = \theta_i/m \quad (38)$$

Figure 18:
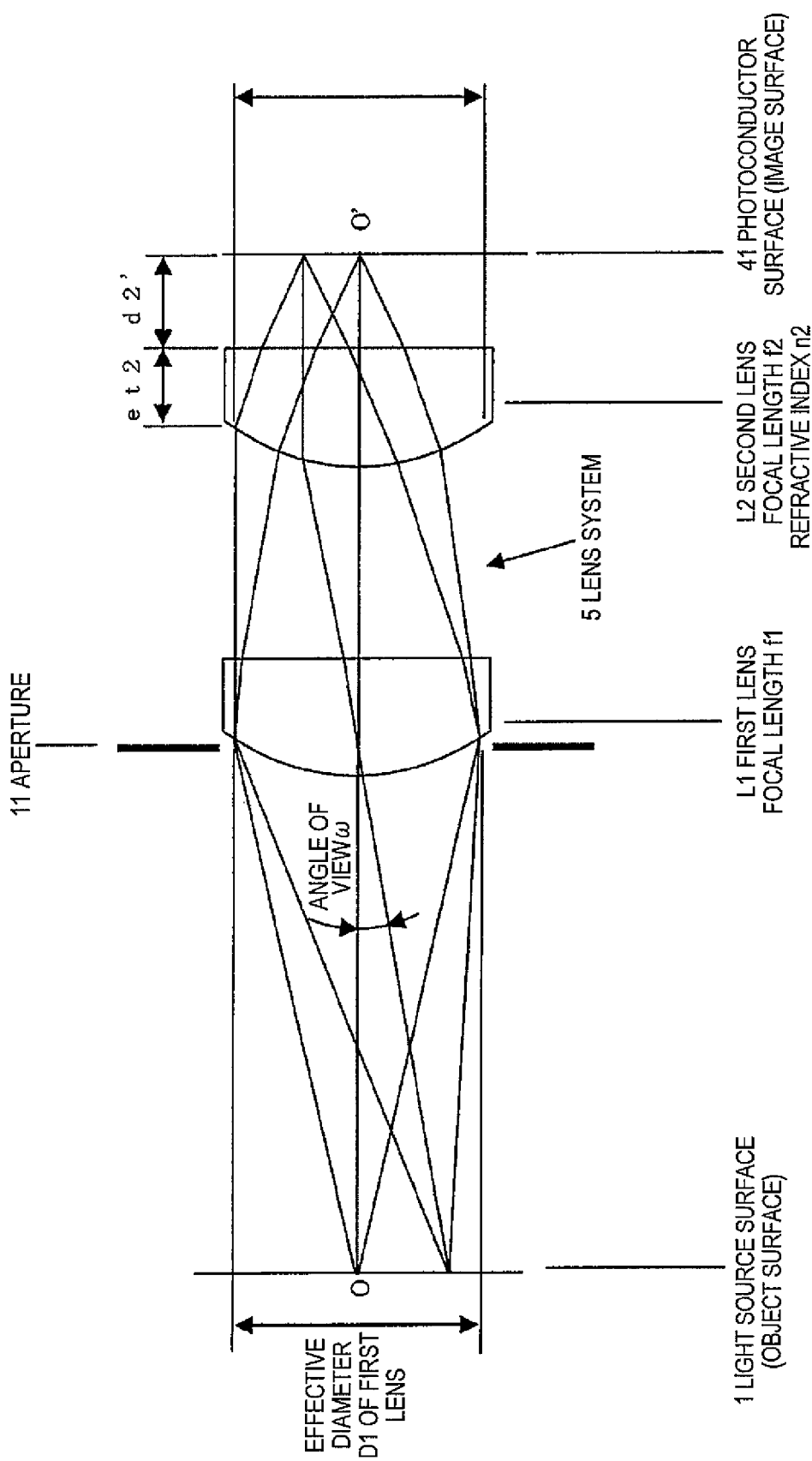
FIG. 18 is a view for examining a case where a second lens included in a microlens is formed by using a plano-convex thick lens.

Next, a case in which the second lens L2 that forms the microlens 5 is formed by using a plano-convex thick lens as shown in FIG. 18 will be examined noting a beam passing through the outermost diameter of the second lens L2.

Figure 19:
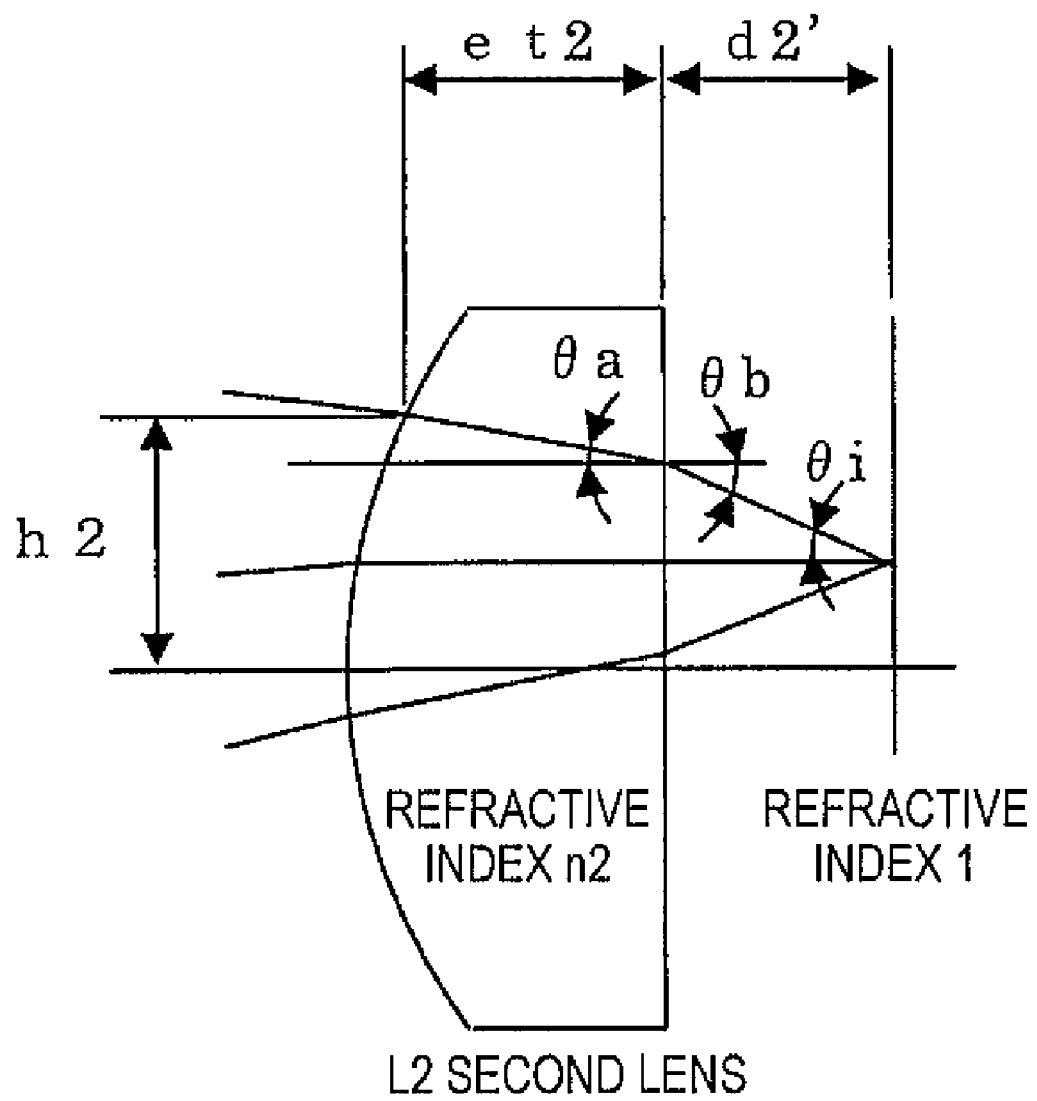
FIG. 19 is a view illustrating the neighborhood of the second lens of FIG. 18 in an enlarged manner.

As shown in FIG. 19, the outermost beam passage height $h_2$ of light beams converging on the end pixel of the image surface pixel group 80 is expressed by the following expression (39) assuming that the refractive index in the air is set to 1.

$$h_2 = W_i/2 + d_2'\theta_i + e_{t2}\theta_a$$
$$= W_i/2 + d_2'\theta_i + e_{t2}\theta_b/n_2$$
$$= W_i/2 + d_2'\theta_i + e_{t2}\theta_i/n_2$$
$$= W_i/2 + (d_2' + e_{t2}/n_2)\theta_i \quad (39)$$

Here, $d_2{}^1$ is a distance from an image-side flat surface of the second lens L2 to the image surface 41, $e_{t2}$ is a distance (thickness of an effective diameter portion of the second lens) in the direction of the optical axis O-O' from a point, at which an outermost light beam of light flux converging on the end pixel of the image surface pixel group 80 is incident on an object-side convex surface of the second lens L2, to the image-side flat surface of the second lens L2, $n_2$ is a refractive index of the second lens L2, and $\theta_a$ and $\theta_b$ are angle of incidence and angle of refraction of the outermost light beam to the image-side flat surface of the second lens L2, respectively (FIG. 19).

From $D_2 \geq 2h_2$, the following expression (40) is obtained.

$$D_2 \geq W_i + 2(d_2' + e_{t2}/n_2)\theta_i \quad (40)$$

It can be seen that $S_i$ and $(d_2' + e_{t2}/n_2)$ correspond to each other when the expression (40) and the expression (23) are compared. When this is applied to the expression (24) for rearrangement, the following expression (41) is obtained.

$$W_i \geq 2(d_2' + e_{t2}/n_2)\theta_i/(m-1) + \alpha/(m-1) \quad (41)$$

In the case when a plano-convex thick lens is used as the second lens L2, conditions for disposing the lens system 5 in the shape of an array such that the effective diameter $D_1$ of the first lens is equal to or smaller than the effective diameter $D_2$ of the second lens are expressed by the expressions (21) and (41).

Furthermore, the effective diameter $D_2$ of the second lens can be suppressed small by setting the image surface pixel group width $W_i$ by the following expression obtained by using an equal sign in the expression (41).

$$W_i = 2(d_2' + e_{t2}/n_2)\theta_i/(m-1) + \alpha/(m-1) \quad (41)'$$

Furthermore, in the above explanation, the lens system 5 configured to include the two positive lenses L1 and L2 is an axially-symmetric lens system in which focal lengths and focal positions in the main scanning direction and the sub-scanning direction are equal to each other. However, the lens system 5 that forms the microlens array 6 may be an anamorphic lens system in which focal lengths and magnifications in the main scanning direction and the sub-scanning direction are different. In this case, the aperture diaphragm 11 is preferably disposed on the object side of the lens system 5 so that the object side is telecentric in the main scanning direction (main scanning cross section). Furthermore, in this case, values on the main scanning cross section are used for the focal length $f_2$ of the second lens L2, the distance $S_i$ from the rear-side principal plane of the second lens L2 to the image surface 41, and the like.

Furthermore, in the invention, being telecentric on the object side is not limited to a case where the aperture diaphragm 11 is positioned at the front-side focal position of the microlens 5 so that main light beams incident on each pixel of the image surface pixel group 80 of the image surface 41 are completely parallel to the optical axis O-O', but includes a case where main light beams incident on a light-emitting element image at the end in the main scanning direction are positioned in a range of ±1° with respect to the optical axis O-O' (being approximately telecentric on the object side).

Next, an example of the optical writing line head to which the principle of the invention is applied will be described.

Figure 20:
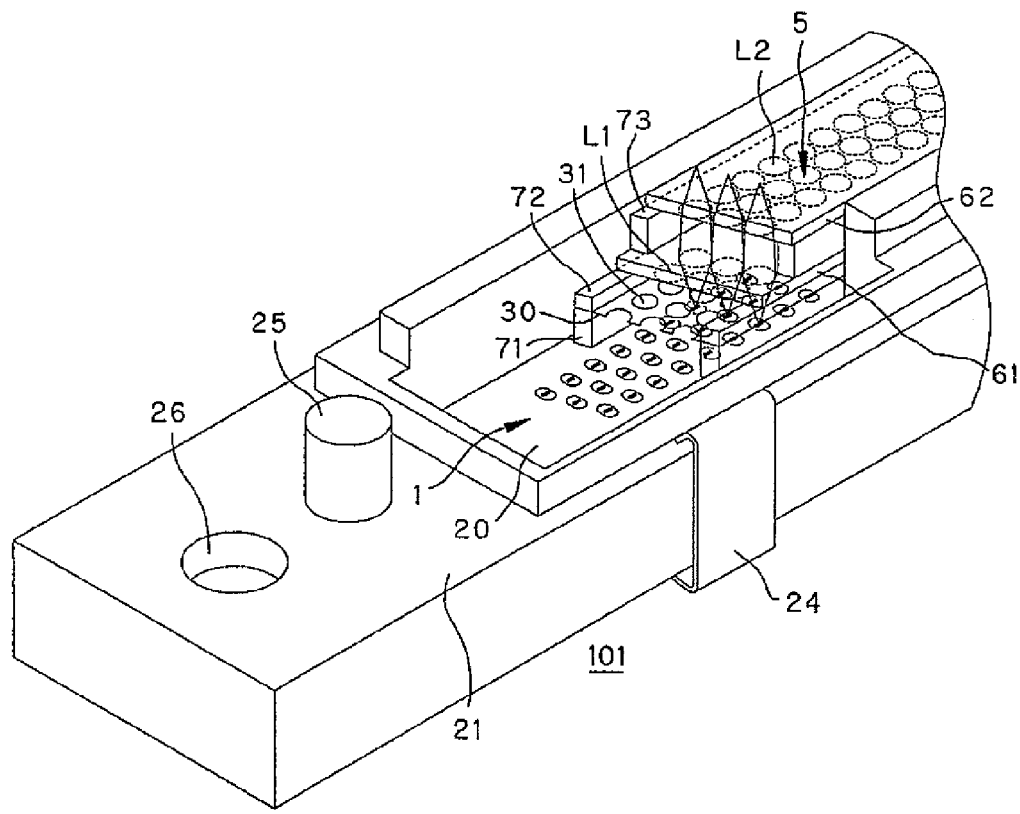
FIG. 20 is a perspective view illustrating a broken part of the configuration of an optical writing line head in a first example of the invention.
Figure 21:
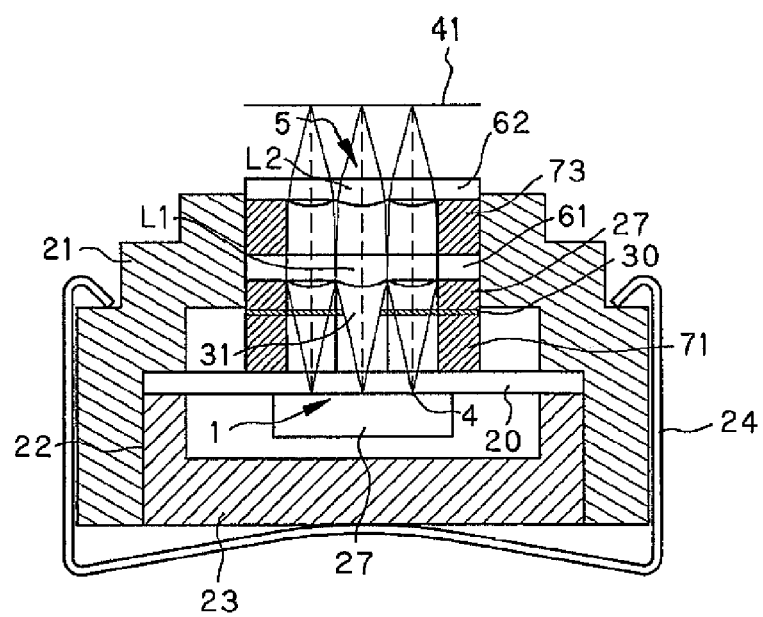
FIG. 21 is a cross-sectional view taken along the sub-scanning direction of FIG. 20.
Figure 22:
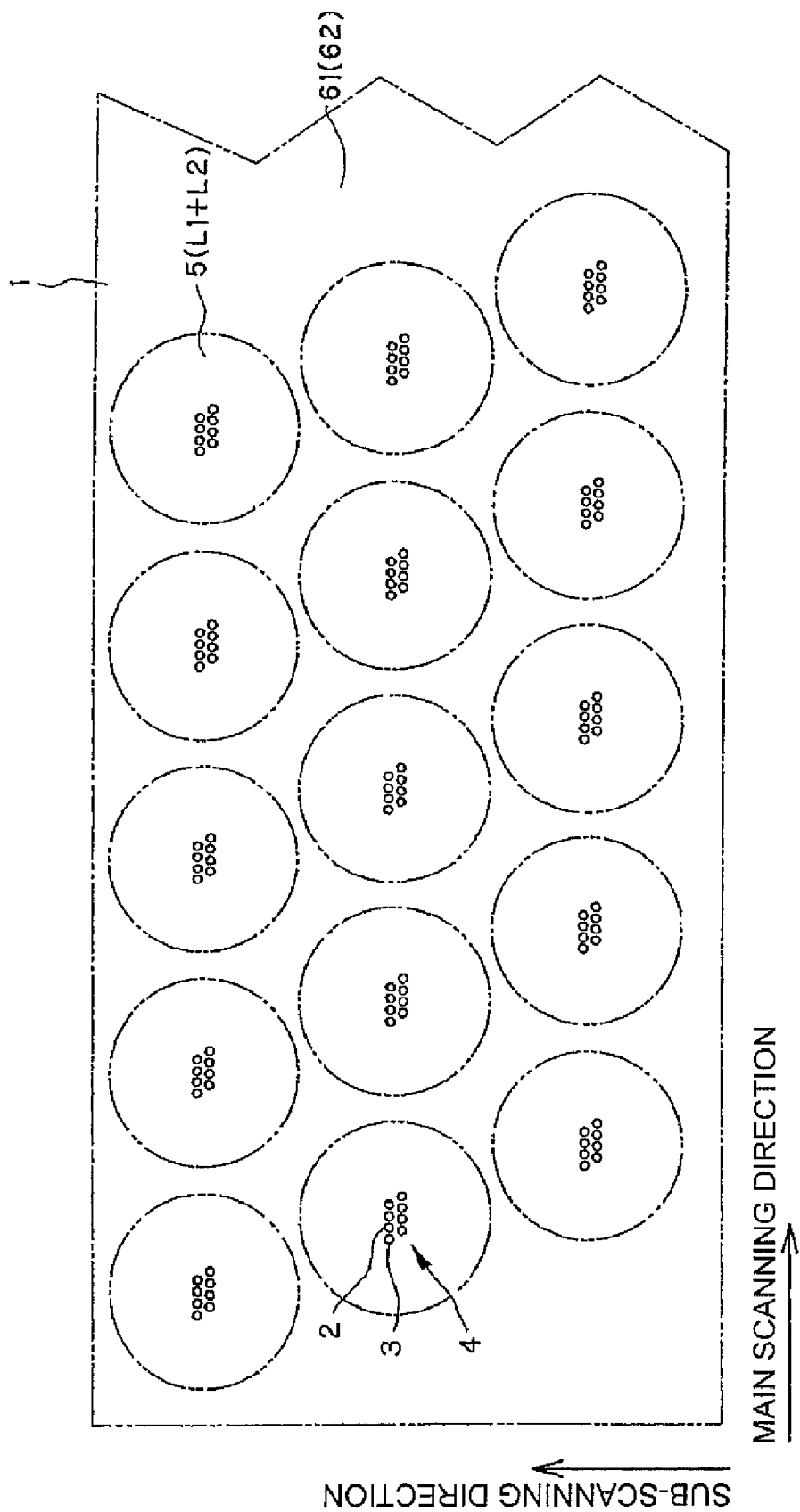
FIG. 22 is a plan view illustrating the arrangement of a light emitter array and a microlens array in the case shown in FIG. 20.
Figure 23:
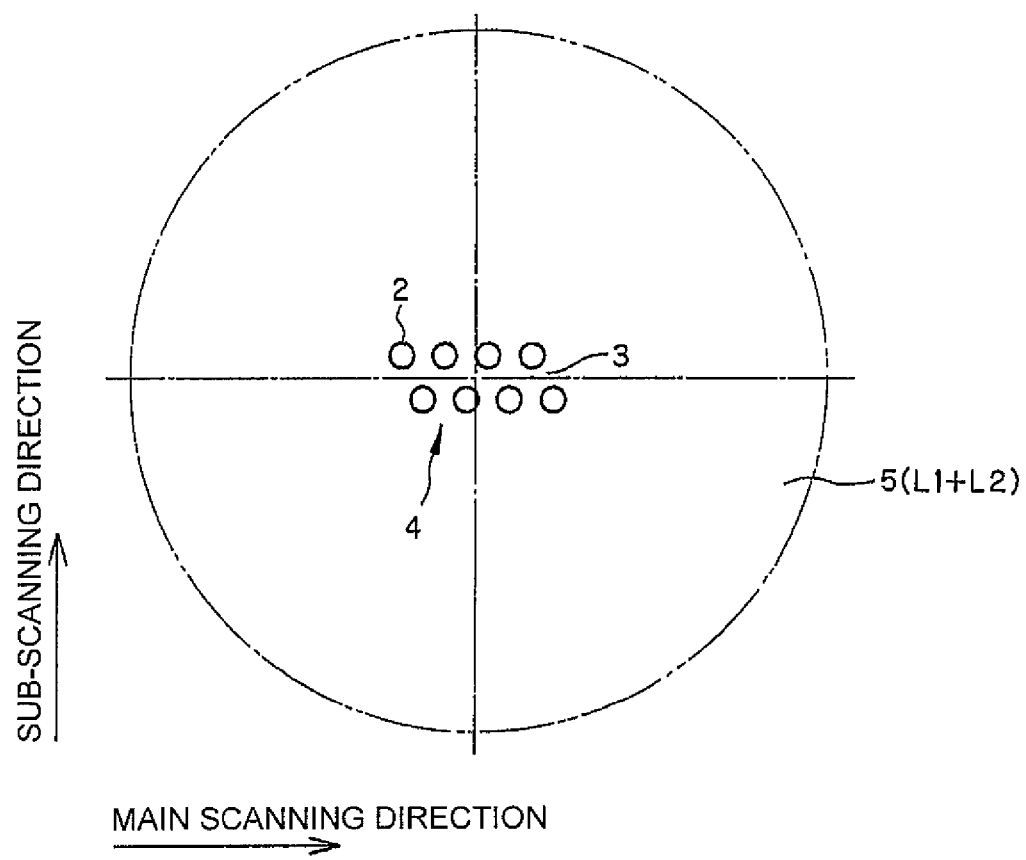
FIG. 23 is a view illustrating the correspondence relationship between one microlens and a light emitter block corresponding thereto.

FIG. 20 is a perspective view illustrating a broken part of the configuration of the optical writing line head in the example, and FIG. 21 is a cross-sectional view taken along the sub-scanning direction of FIG. 20. In addition, FIG. 22 is a plan view illustrating the arrangement of a light emitter array and a microlens array in the case shown in FIG. 22. In addition, FIG. 23 is a view illustrating the correspondence relationship between one microlens and a light emitter block corresponding thereto.

In this example, similar to the case shown in FIGS. 4 and 7, two light-emitting element rows 3 in which four light-emitting elements 2 (organic EL elements in this example) are arrayed in the main scanning direction are formed in two rows in the sub-scanning direction to thereby form one light emitter block 4, the plurality of light emitter blocks 4 are provided in the main scanning direction and the sub-scanning direction to thereby form the light emitter array 1, and the light emitter blocks 4 are arrayed in a zigzag manner in the sub-scanning direction by shifting the head positions thereof in the main scanning direction. In the example shown in FIG. 20, the light emitter blocks 4 are disposed in three rows in the sub-scanning direction. Such a light emitter array 1 is formed on a rear surface of a glass substrate 20 and is driven by a driving circuit formed on the rear surface of the same glass substrate 20. In addition, the organic EL elements (light-emitting elements 2) on the rear surface of the glass substrate 20 are sealed with a sealing member 27.

The glass substrate 20 is inserted into a socket 22 provided in a long case 21 and is fixed by a fixing bracket 24 after a back lid 23 is put on the glass substrate 20. Positioning pins 25 provided at both ends of the long case 21 are inserted into opposite positioning holes of the main body of an image forming apparatus and are fixed by screwing fixing screws to screw holes of the main body of the image forming apparatus through screw insertion holes 26 provided at both ends of the long case 21, such that an optical writing line head 101 is fixed at the predetermined position.

In addition, on a surface side of the glass substrate 20 of the case 21, an aperture plate 30 in which apertures 31 (FIGS. 24 and 25) are provided so as to be aligned with the middle of each light emitter block 4 of the light emitter array 1 is disposed with a first spacer 71 interposed therebetween. On the aperture plate 30, a first microlens array 61 which uses the positive lens L1 as a constituent component such that the middle of each light emitter block 4 of the light emitter array 1 is aligned with the positive lens L1 is disposed with a second spacer 72 interposed therebetween. On the first microlens array 61, a second microlens array 62 which uses the positive lens L2 as a constituent component such that the middle of each light emitter block 4 of the light emitter array 1 is aligned with the positive lens L2 is disposed with a third spacer 73 interposed therebetween.

Thus, a lens array of the microlens 5 which projects a light-emitting element row of each light emitter block 4 is formed by combination of the first microlens array 61 and the second microlens array 62.

Figure 24:
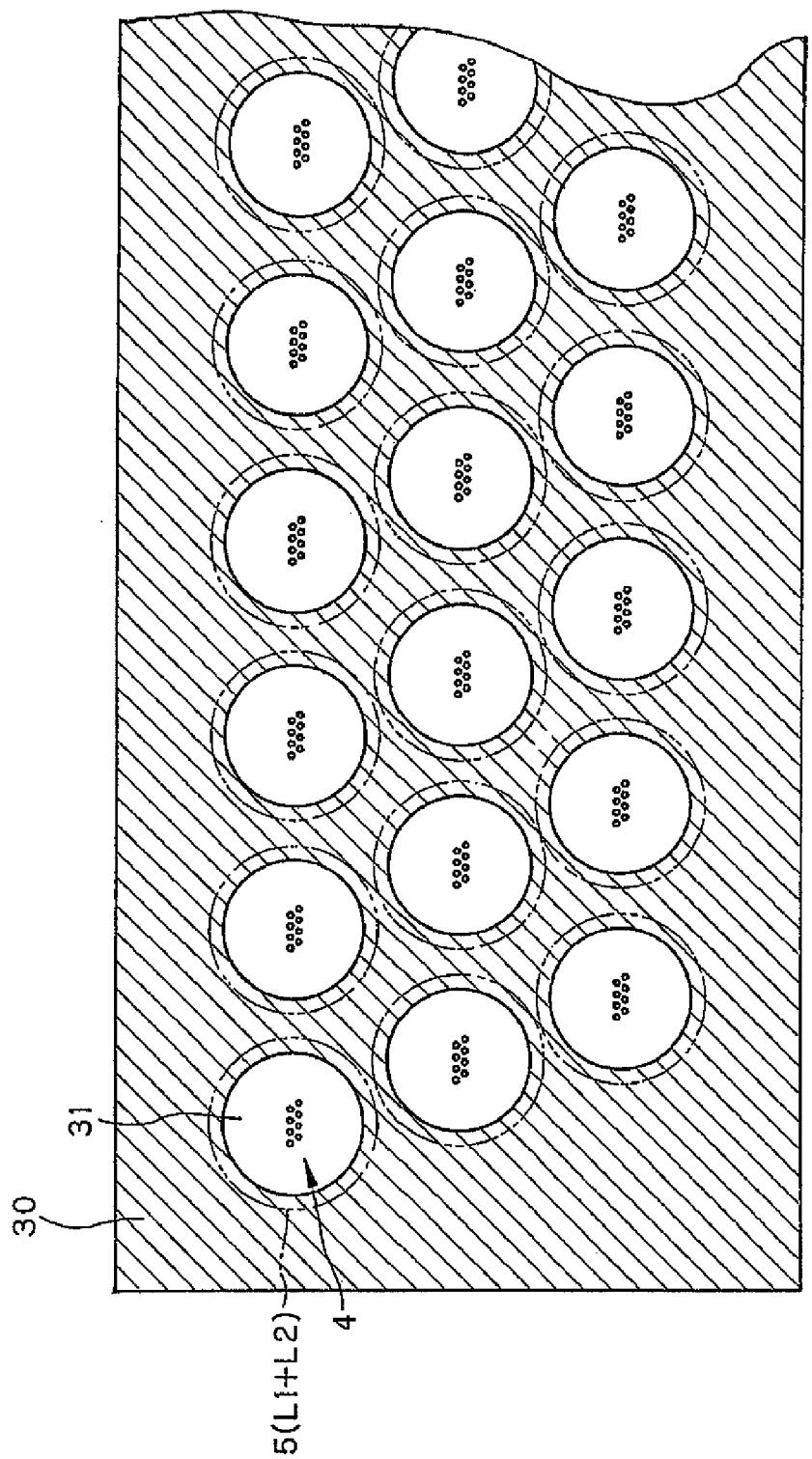
FIG. 24 is a plan view illustrating an aperture plate disposed corresponding to a light emitter block of a light emitter array.
Figure 25:
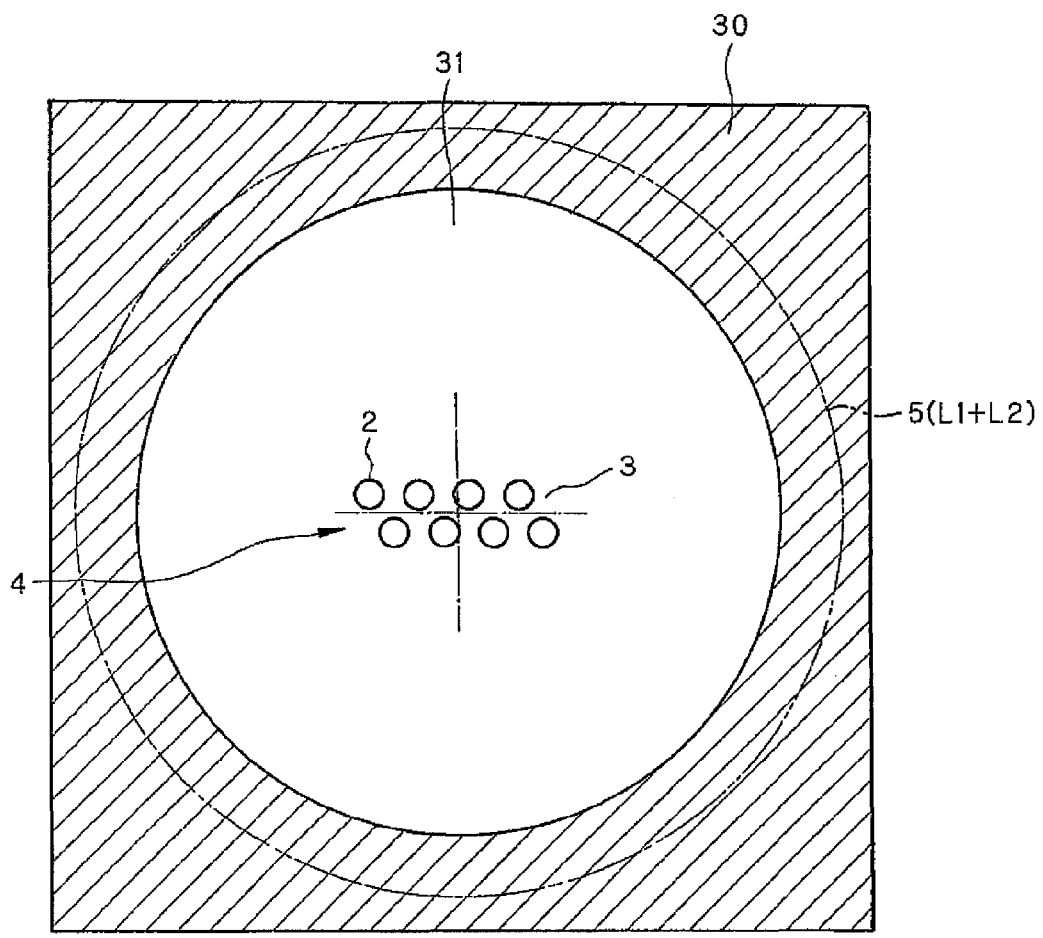
FIG. 25 is a view illustrating an opening of an aperture plate with respect to one light emitter block.

Furthermore, in the invention, the aperture plate 30 is disposed so as to match the object side (front side) focal position of the composite lens system configured to include the positive lens L1, which forms the first microlens array 61, and the positive lens L2, which forms the second microlens array 62. In addition, the focal length $f_2$ of the positive lens L2 is set to satisfy the expression (21) and the width (full width) $W_i$ along the main scanning direction of an image of the light emitter block 4 on the photoconductor (image surface) 41 is set to satisfy the expression (24). Details of the aperture plate 30 are shown in FIGS. 24 and 25. FIG. 24 is a plan view illustrating the aperture plate 30 disposed corresponding to the light emitter block 4 of the light emitter array 1, and FIG. 25 is a view illustrating the aperture 31 of the aperture plate 30 with respect to one light emitter block 4. In the aperture plate 30, the apertures 31 are provided so as to be aligned with the middle (optical axis) of each microlens 5, which is configured to include the positive lens L1 and the positive lens L2, and the middle of the light emitter block 4. In this example, the shape of each aperture 31 is a circular shape. However, the shape of each aperture 31 may also be an elliptical or rectangular shape of restricting at least the aperture diameter in the main scanning direction.

In the above example, the optical writing line head 101 that uses as the light-emitting elements 2 organic EL elements provided on the rear surface of the glass substrate 20 and uses light emitted toward the surface side of the glass substrate 20, that is, the optical writing line head 101 having a bottom emission arrangement has been described. However, an EL device or an LED in which the light-emitting elements 2 are disposed on the surface of the substrate may also be used.

Figure 26:
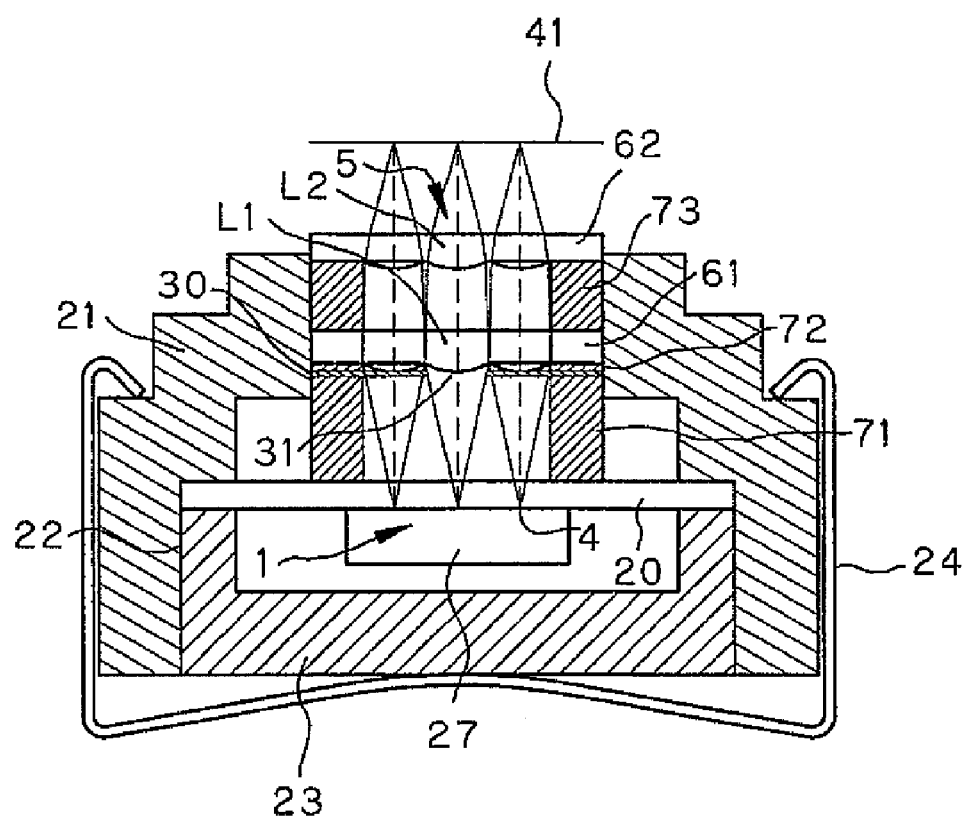
FIG. 26 is a view corresponding to FIG. 21 in a case where an aperture plate is disposed adjacent to a first microlens array.

In addition, a view corresponding to FIG. 21 in a case where the aperture plate 30 is disposed adjacent to the first microlens array 61 is shown in FIG. 26. Since the case is basically similar to the example shown in FIGS. 21 and 22, an explanation thereof will be omitted.

Figure 27:
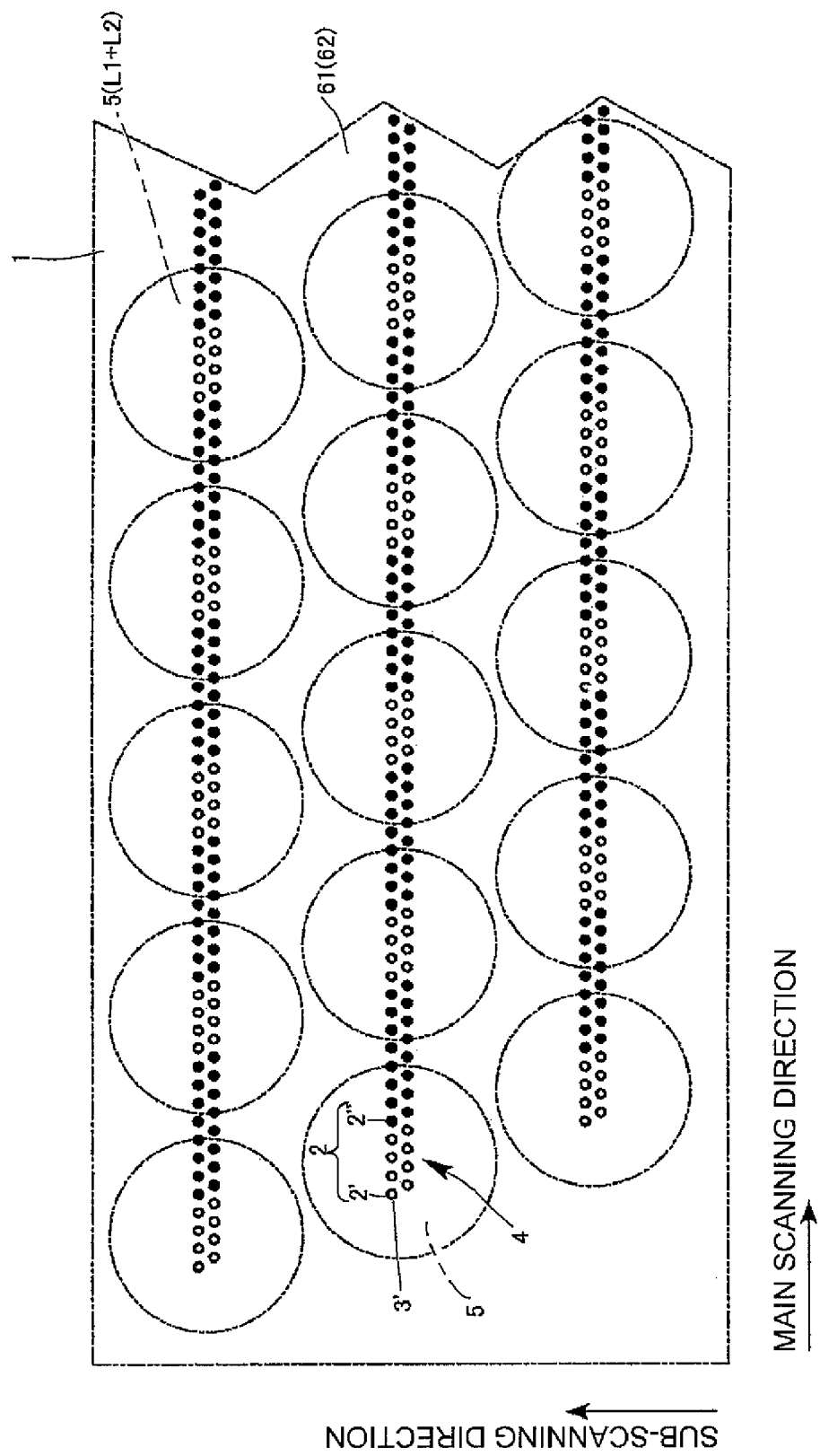
FIG. 27 is a view corresponding to FIG. 22 in the case of forming a light emitter block by arraying light-emitting elements in a shape of a long row in the main scanning direction and controlling emission of a part of the light-emitting elements.

In the above explanation, as shown in FIGS. 7 and 22, the light emitter array 1 is configured such that the light emitter block 4 is formed by providing the light-emitting element row 3, in which a plurality of light-emitting elements 2 are arrayed in the main scanning direction, in one or a plurality of rows in the sub-scanning direction and the microlens 5 is disposed corresponding to each light emitter block 4. However, the same light emitter block 4 as in the cases shown in FIGS. 7 and 22 can be configured by disposing the light-emitting elements 2 in the shape of a long row in which the light-emitting elements 2 are continuously disposed at small distances therebetween in the main scanning direction, making a control such that only a light-emitting element group corresponding to the light emitter block 4 disposed as described above emits light, and making a control such that light-emitting elements existing between the light-emitting element groups do not emit light. FIG. 27 is a view corresponding to FIG. 22 in that case. That is, each of the light emitter blocks 4 can be configured by disposing, as the light emitter array 1, a light-emitting element row 31 in the shape of a long row in which the light-emitting elements 2 are continuously disposed at small equal distances therebetween in the main scanning direction, making a control such that only a group of light-emitting elements 2' (expressed by ○) related to formation of the imaging spots 8 through the microlens 5 of the light-emitting element row 3' emits light, and making a control such that a group of light-emitting elements 2" (expressed by •) existing between the groups of light-emitting elements 2' do not emit light. In the case shown in FIG. 27, the microlenses 5 are disposed in three rows in the main scanning direction, the light-emitting element rows 31 are formed in two rows in the sub-scanning direction so as to correspond to each row of the microlenses 5, the light emitting elements 2 of the two light-emitting element rows 31 are disposed in the zigzag manner, and a control is made such that only four light emitting elements 2' of each light-emitting element row 3' emit light and eight light-emitting elements 211 existing between two groups each having the four light emitting elements 2' do not emit light.

Figure 28:
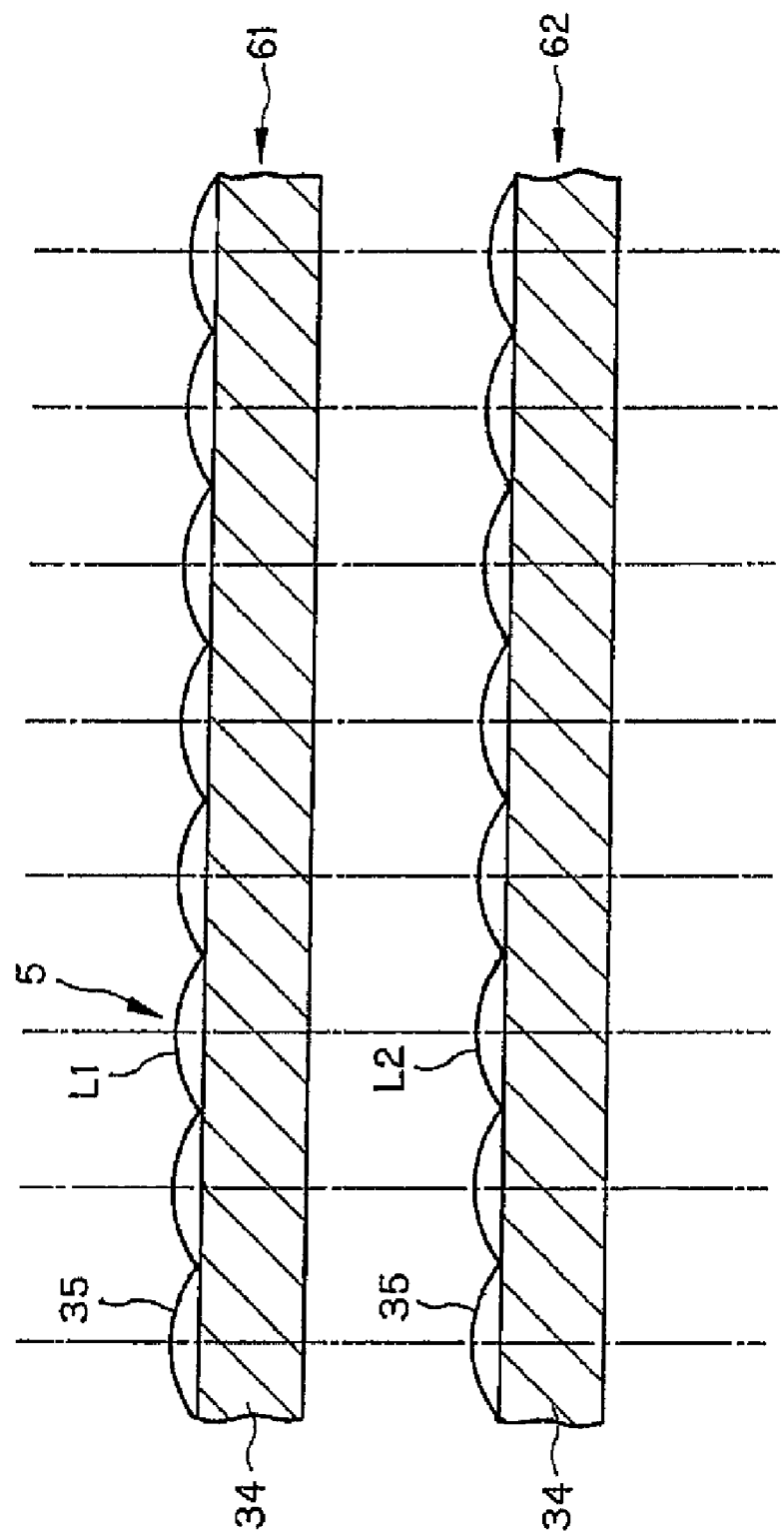
FIG. 28 is a cross-sectional view taken along the main scanning direction in the case where a microlens array is configured to include two microlens arrays.

In addition, a known microlens array with any kind of configuration may be used as the microlens arrays 61 and 62 used for the optical writing line head 101 according to the embodiment of the invention. FIG. 28 is a cross-sectional view taken along the main scanning direction in the case of configuring the array of the microlenses 5 by combining the first microlens array 61 and the second microlens array 62 such that the microlenses L1 and L2 are aligned on the same axis. In this example, the microlenses L1 and L2 are aligned on one side (object side) of the glass substrate 34 of each of the microlens arrays 61 and 62 and a lens surface portion 35 formed of a transparent resin is integrally formed, thereby configuring each of the microlenses L1 and L2. In this case, by making an image-side surface of the second microlens array 62 flat, even if toner of a developer disperses to adhere to the flat surface of the microlens array when the microlens array is used as a microlens array of a line head of an image forming apparatus, for example, the toner can be simply cleaned. As a result, the cleaning efficiency is improved.

Next, examples of specific numbers of an optical system used in the above examples are shown as first to sixth examples.

FIGS. 29A and 29B are cross-sectional views taken along the main scanning direction and the sub-scanning direction illustrating an optical system corresponding to one microlens 5 of the first example. This is an example in which a glass substrate is not disposed on the emission side of the light-emitting element 2, the microlens 5 is a composite lens system configured to include the biconvex positive lens L1 and the positive meniscus lens L2 having a convex surface toward an object side, the aperture plate 30 is disposed at an object side (front side) focal point of the composite lens system configured to include the biconvex positive lens L1 and the positive meniscus lens L2 so that the image side is telecentric, the focal length $f_2$ of the positive meniscus lens L2 satisfies the expression (21), the image surface pixel group width $W_i$ satisfies the expression (24), both the effective diameter $D_1$ of the first lens L1 and the effective diameter $D_2$ of the second lens L2 are less than the upper limit of the second lens effective diameter $D_2$ decided by the expression (20), and the effective diameter $D_1$ of the first lens L1 is suppressed to be approximately equal to the effective diameter $D_2$ of the second lens L2.

Numeric data of this example is shown below. In the order from a side of the light emitter block 4 to a side of the photoconductor (image surface) 41, $r_1$, $r_2$, ... are radii of curvature (mm) of optical surfaces, $d_1$, $d_2$, ... are distances between optical surfaces (mm), $nd_1$, $nd_2$, ... are refractive indexes of d lines of transparent media, and $v_{d1}$, $v_{d2}$, ... are Abbe numbers of transparent media. In addition, $r_1$, $r_2$, ... also indicate optical surfaces. The same is true for the following examples. Moreover, in this example, the optical surface $r_1$ is the light emitter block (object surface) 4, the optical surface $r_2$ is the aperture 31 of the aperture plate 30, the optical surfaces $r_3$ and $r_4$ are object-side surface and image-side surface of the biconvex positive lens L1, the optical surfaces $r_5$ and $r_6$ are object-side surface and image-side surface of the positive meniscus lens L2, and the optical surface $r_7$ is the photoconductor (image surface) 41. In addition, the object-side surface $r_3$ of the biconvex positive lens L1 is an aspheric surface. Assuming that a distance from an optical axis is $r_7$ the aspheric shape is expressed by $cr^2/[1+\sqrt{1-(1+K)c^2r^2}]+Ar^4$.

Here, 'c' is a curvature (1/r) on the optical axis, K is a conic coefficient, and A is a fourth-order aspheric coefficient. In the following numeric data, $K_3$ is a conic coefficient of the object-side surface $r_3$ of the biconvex positive lens L1. In addition, the expression method of an aspheric surface is the same in the following examples.

FIGS. 30A and 30B are cross-sectional views taken along the main scanning direction and the sub-scanning direction illustrating an optical system corresponding to one microlens 5 of the second example. This is an example in which a glass substrate is not disposed on the emission side of the light-emitting element 2, the microlens 5 is a composite lens system configured to include the biconvex positive lens L1 and the biconvex positive lens L2, the aperture plate 30 is disposed at the object side (front side) focal point of the composite lens system configured to include the biconvex positive lens L1 and the biconvex positive lens L2 so that the image side is telecentric, the focal length $f_2$ of the biconvex positive lens L2 satisfies the expression (21), and the image surface pixel group width $W_i$ satisfies the expression (24)'. As compared with the first example, the effective diameter $D_2$ of the second lens is suppressed small by about 13%.

Moreover, in this example, the optical surface $r_1$ is the light emitter block (object surface) 4, the optical surface $r_2$ is the aperture 31 of the aperture plate 30, the optical surfaces $r_3$ and $r_4$ are object-side surface and image-side surface of the biconvex positive lens L1, the optical surfaces $r_5$ and $r_6$ are object-side surface and image-side surface of the biconvex positive lens L2, and the optical surface $r_7$ is the photoconductor (image surface) 41. In addition, the object-side surface $r_5$ of the biconvex positive lens L2 is an aspheric surface. In addition, in the following numeric data, $K_5$ is a conic coefficient of the object-side surface $r_5$ of the biconvex positive lens L2.

Figure 31A:
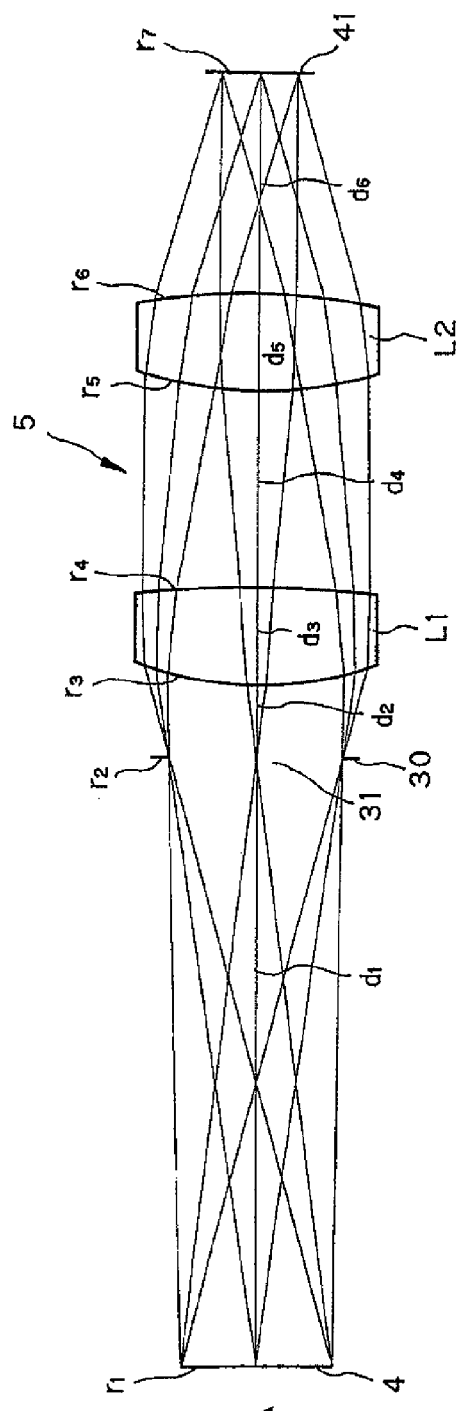
FIGS. 31A and 31B are cross-sectional views taken along the main scanning direction and the sub-scanning direction illustrating an optical system corresponding to one microlens in a third example.
Figure 31B:
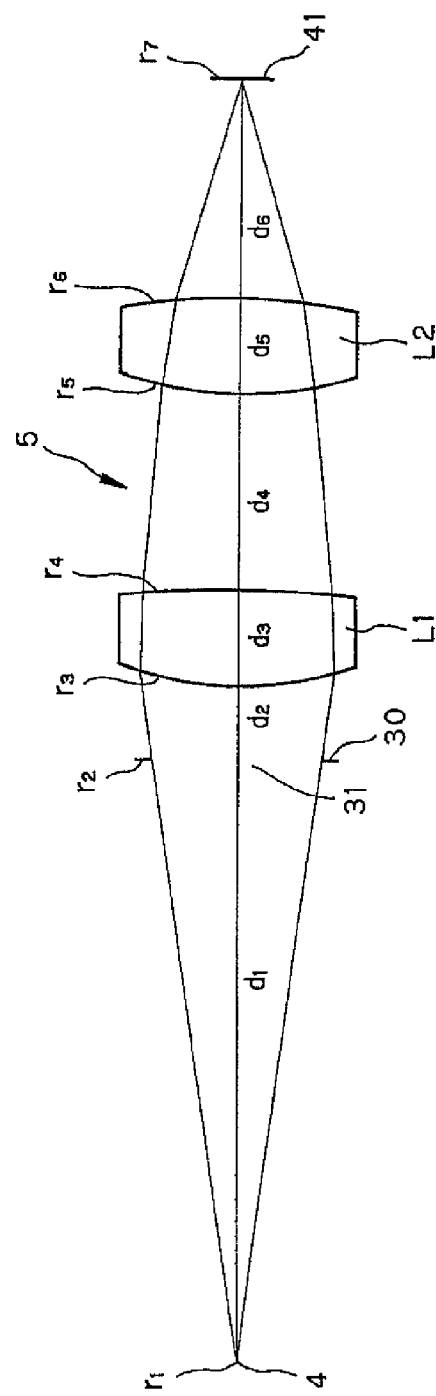

FIGS. 31A and 31B are cross-sectional views taken along the main scanning direction and the sub-scanning direction illustrating an optical system corresponding to one microlens 5 of the third example. This is an example in which a glass substrate is not disposed on the emission side of the light-emitting element 2, the microlens 5 is a composite lens system configured to include the biconvex positive lens L1 and the biconvex positive lens L2, the aperture plate 30 is disposed at the object side (front side) focal point of the composite lens system configured to include the biconvex positive lens L1 and the biconvex positive lens L2 so that the image side is telecentric, the focal length $f_2$ of the biconvex positive lens L2 satisfies the expression (26), and the image surface pixel group width $W_i$ satisfies the expression (27). The effective diameter $D_1$ of the first lens is slightly larger than the effective diameter $D_2$ of the second lens in this example and there is a difference between this example and the paraxial analysis. However, the effective diameter DL of the first lens is suppressed to be smaller than the upper limit of the effective diameter $D_2$ of the second lens decided by the expression (20).

Moreover, in this example, the optical surface $r_1$ is the light emitter block (object surface) 4, the optical surface $r_2$ is the aperture 31 of the aperture plate 30, the optical surfaces $r_3$ and $r_4$ are object-side surface and image-side surface of the biconvex positive lens L1, the optical surfaces $r_5$ and $r_6$ are object-side surface and image-side surface of the biconvex positive lens L2, and the optical surface $r_7$ is the photoconductor (image surface) 41. In addition, both the object-side surface $r_3$ of the biconvex positive lens L1 and the object-side surface $r_5$ of the biconvex positive lens L2 are aspheric surfaces. In addition, in the following numeric data, $K_3$ is a conic coefficient of the object-side surface $r_3$ of the biconvex positive lens L1 and $K_5$ is a conic coefficient of the object-side surface $r_5$ of the biconvex positive lens L2.

FIGS. 32A and 32B are cross-sectional views taken along the main scanning direction and the sub-scanning direction illustrating an optical system corresponding to one microlens 5 of the fourth example. This is an example in which a glass substrate is not disposed on the emission side of the light-emitting element 2, the microlens 5 is a composite lens system configured to include the biconvex positive lens L1 and the biconvex positive lens L2, the aperture plate 30 is disposed at the object side (front side) focal point of the composite lens system configured to include the biconvex positive lens L1 and the biconvex positive lens L2 so that the image side is telecentric, the focal length $f_2$ of the biconvex positive lens L2 satisfies the expression (26), and the image surface pixel group width $W_i$ satisfies the expression (27). The effective diameter DL of the first lens is slightly larger than the effective diameter $D_2$ of the second lens in this example and there is a difference between this example and the paraxial analysis. However, the effective diameter $D_1$ of the first lens is suppressed to be smaller than the upper limit of the effective diameter $D_2$ of the second lens decided by the expression (20).

Moreover, in this example, the optical surface $r_1$ is the light emitter block (object surface) 4, the optical surface $r_2$ is the aperture 31 of the aperture plate 30, the optical surfaces $r_3$ and $r_4$ are object-side surface and image-side surface of the biconvex positive lens L1, the optical surfaces $r_5$ and $r_6$ are object-side surface and image-side surface of the biconvex positive lens L2, and the optical surface $r_7$ is the photoconductor (image surface) 41. In addition, both the image-side surface $r_4$ of the biconvex positive lens L1 and the object-side surface $r_5$ of the biconvex positive lens L2 are aspheric surfaces. In addition, in the following numeric data, $K_4$ is a conic coefficient of the image-side surface $r_4$ of the biconvex positive lens $L_1$ and $K_5$ is a conic coefficient of the object-side surface $r_5$ of the biconvex positive lens L2.

Figure 33A:
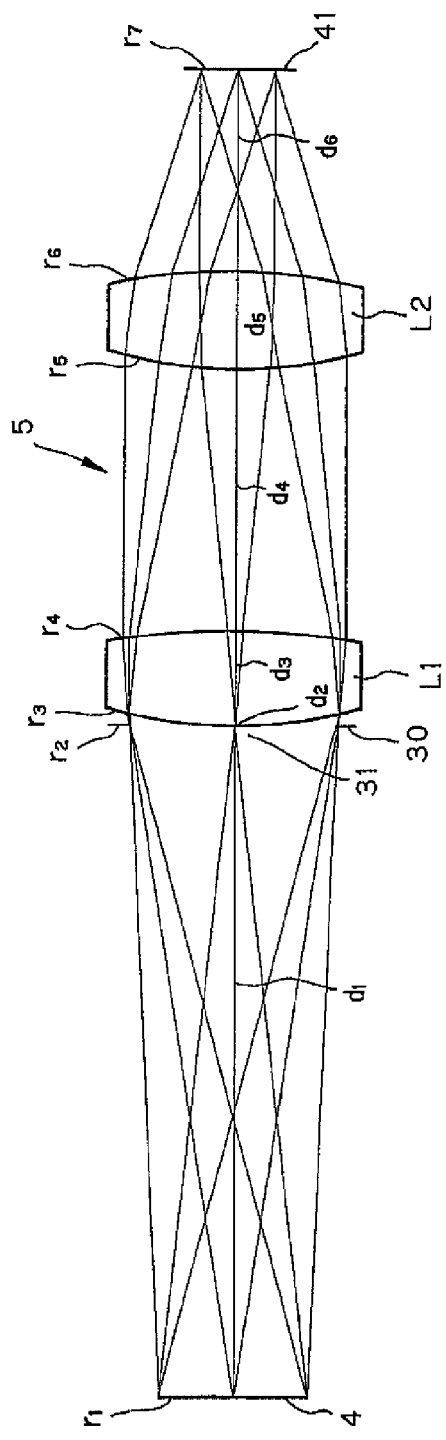
FIGS. 33A and 33B are cross-sectional views taken along the main scanning direction and the sub-scanning direction illustrating an optical system corresponding to one microlens in the third example.
Figure 33B:
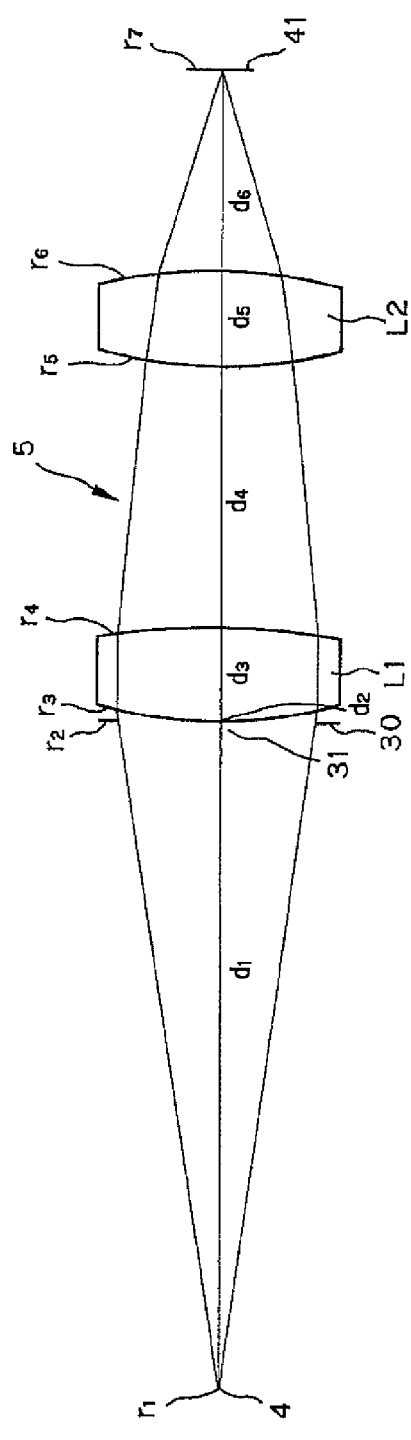

FIGS. 33A and 33B are cross-sectional views taken along the main scanning direction and the sub-scanning direction illustrating an optical system corresponding to one microlens 5 of the fifth example. This is an example in which a glass substrate is not disposed on the emission side of the light-emitting element 2, the microlens 5 is a composite lens system configured to include the biconvex positive lens L1 and the biconvex positive lens L2, the aperture plate 30 is disposed at a surface apex position of an object-side convex surface of the biconvex positive lens L1 so that the image side is telecentric, the focal length $f_2$ of the biconvex positive lens L2 satisfies the expression (26), and the image surface pixel group width $W_i$ satisfies the expression (27). In this example, the same lenses L1 and L2 are used and a gap between the aperture 31 of the aperture plate 30 and the object-side surface of the biconvex positive lens L1 is made small compared with the fourth example. As a result, a maximum angle of view becomes small by about 5%.

Moreover, in this example, the optical surface $r_1$ is the light emitter block (object surface) 4, the optical surface $r_2$ is the aperture 31 of the aperture plate 30, the optical surfaces $r_3$ and $r_4$ are object-side surface and image-side surface of the biconvex positive lens L1, the optical surfaces $r_5$ and $r_6$ are object-side surface and image-side surface of the biconvex positive lens L2, and the optical surface $r_7$ is the photoconductor (image surface) 41. In addition, both the image-side surface $r_4$ of the biconvex positive lens L1 and the object-side surface $r_5$ of the biconvex positive lens L2 are aspheric surfaces. In addition, in the following numeric data, $K_4$ is a conic coefficient of the image-side surface $r_4$ of the biconvex positive lens $L_1$ and $K_5$ is a conic coefficient of the object-side surface $r_5$ of the biconvex positive lens L2.

Figure 34A:
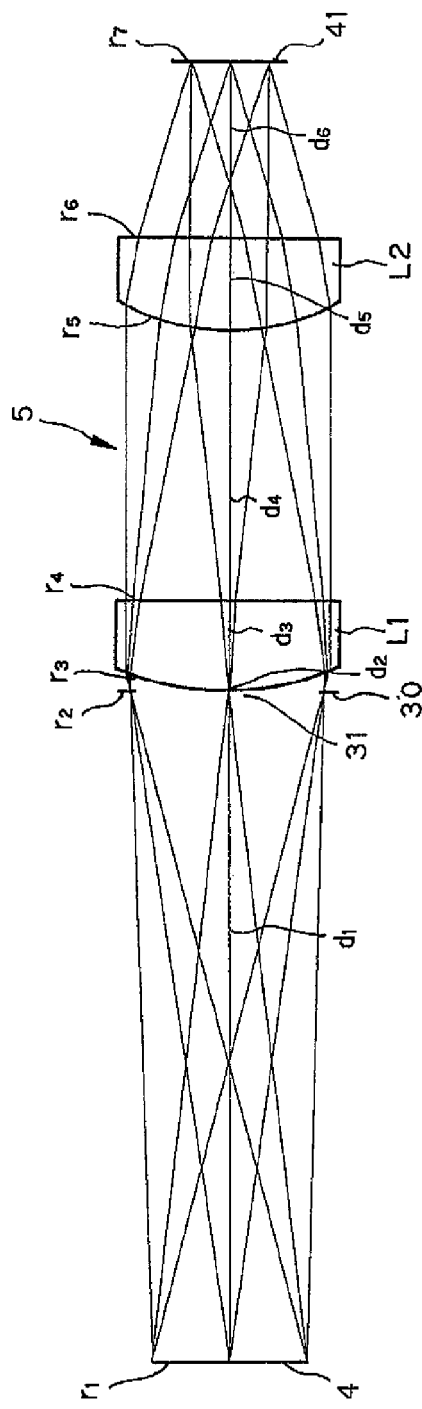
FIGS. 34A and 34B are cross-sectional views taken along the main scanning direction and the sub-scanning direction illustrating an optical system corresponding to one microlens in the fourth example.
Figure 34B:
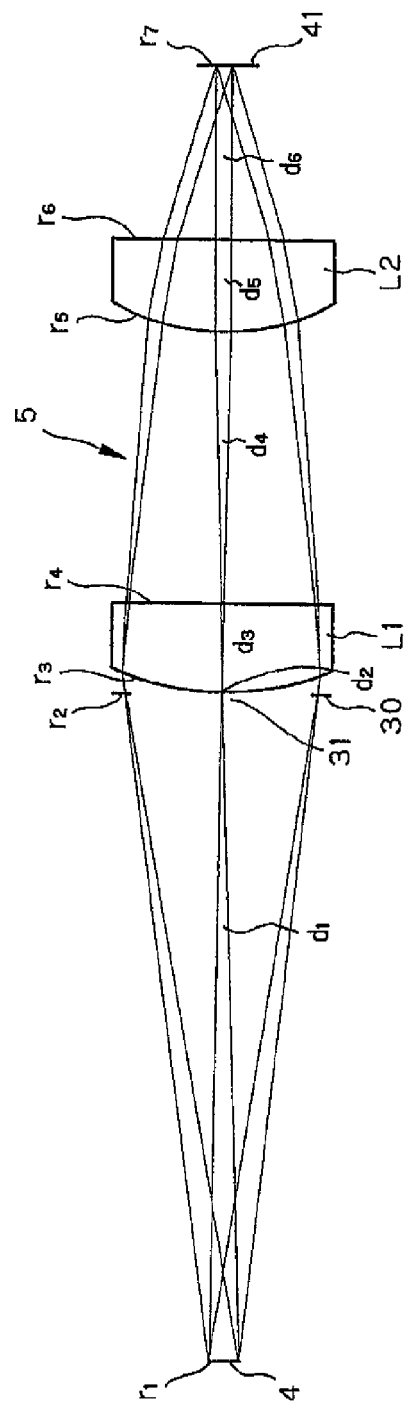

FIGS. 34A and 34B are cross-sectional views taken along the main scanning direction and the sub-scanning direction illustrating an optical system corresponding to one microlens 5 of the sixth example. This is an example in which a glass substrate is not disposed on the emission side of the light-emitting element 2, the microlens 5 is a composite lens system configured to include the plano-convex positive lens L1 and the plano-convex positive lens L2, the aperture plate 30 is disposed at a surface apex position of an object-side convex surface of the plano-convex positive lens L1 so that the image side is telecentric, the focal length $f_2$ of the plano-convex positive lens L2 satisfies the expression (21), and the image surface pixel group width $W_i$ satisfies the expression (41).

Like this example, by setting both the first positive lens L1 and the second positive lens L2 as plano-convex lenses, the lens formation surface formed as the first microlens arrays 61 and 62 is formed as a single surface, which is advantageous in that manufacturing becomes easy.

Furthermore, by making the image-side surface of the second positive lens L2 flat, the entire image-side surface of the second microlens array 62 that forms the lens array of the microlens 5 can be made as a flat surface. Accordingly, for example, even if toner of a developer disperses to adhere to the flat surface of the microlens array when the microlens array is used as a microlens array of a line head of an image forming apparatus, the toner can be simply cleaned. As a result, the cleaning efficiency is improved.

Moreover, in this example, the optical surface $r_1$ is the light emitter block (object surface) 4, the optical surface $r_2$ is the aperture 31 of the aperture plate 30, the optical surfaces $r_3$ and $r_4$ are object-side surface and image-side surface of the biconvex positive lens L1, the optical surfaces $r_5$ and $r_6$ are object-side surface and image-side surface of the biconvex positive lens L2, and the optical surface $r_7$ is the photoconductor (image surface) 41. In addition, both the image-side surface $r_4$ of the biconvex positive lens L1 and the object-side surface $r_5$ of the biconvex positive lens L2 are aspheric surfaces. In addition, in the following numeric data, $K_4$ is a conic coefficient of the image-side surface $r_4$ of the biconvex positive lens $L_1$, $K_5$ is a conic coefficient of the object-side surface $r_5$ of the biconvex positive lens L2, $A_4$ is the image-side surface $r_4$ of the biconvex positive lens L1, and $A_5$ is a fourth-order aspheric coefficient of the object-side surface $r_5$ of the biconvex positive lens L2.

First Example
$r_1 = \infty$ (object surface)
$d_1 = 1.7614$
$r_2 = \infty$ (aperture)
$d_2 = 0.5000$
$r_3 = 1.3450$ (aspheric surface)
$d_3 = 0.4000$
$n_{d1} = 1.5168$
$\upsilon_{d1} = 64.2$
$K_3 = -8.9176$
$r_4 = -1.0905 =$
$d_4 = 0.4067$
$r_5 = 0.8498$
$d_5 = 0.4000$
$n_{d2} = 1.5168$
$\upsilon_{d2} = 64.2$
$r_6 = 4.0773 =$
$d_6 = 0.6800$
$r_7 = \infty$ (image surface)
Used wavelength 632.5 nm Image-side angle of aperture (half angle) $\theta_i = 0.1745$ rad (10 deg)
Number of lens rows m=3
Gap between effective regions of second lens $\alpha = 0.2$ mm or more
Distance between image-side principal plane of second lens and image surface $S_i = 1.0$ mm
Lateral magnification $\beta = -0.5$
Full width of light source pixel group $W_O = 0.700$ mm
Full width of image surface pixel group $W_i = 0.350$ mm (when substituted into the expression (24), $W_i \geqq 0.2745$ mm)
Focal length of second lens $f_2 = 2.0$ mm (when substituted into the expression (21), $f_2 \leqq 2.435$ mm)
Effective diameter of first lens (twice of maximum beam passage height on lens by actual beam tracing) $D_1 = 0.695$ mm
Effective diameter of second lens (twice of maximum beam passage height on lens by actual beam tracing) $D_2 = 0.696$ mm (when substituted into the expression (20), $D_2 \leqq 0.850$ mm)

Second Example
$r_1 = \infty$ (object surface)
$d_1 = 1.9304$
$r_2 = \infty$ (aperture)
$d_2 = 0.5000$
$r_3 = 0.9021$
$d_3 = 0.4000$
$n_{d1} = 1.5168$
$\upsilon_{d1} = 64.2$
$r_4 = -4.2410$
$d_4 = 0.4000$
$r_5 = 1.0348$ (aspheric surface)
$d_5 = 0.4000$
$n_{d2} = 1.5168$
$\upsilon_{d2} = 64.2$
$K_5 = -7.3639$
$r_6 = -2.6494$
$d_6 = 0.8029$
$r_7 = \infty$ (image surface)
Used wavelength 632.5 nm
Image-side angle of aperture (half angle) $\theta_i = 0.1745$ rad (10 deg)
Number of lens rows m=3
Gap between effective regions of second lens $\alpha = 0.2$ mm or more
Distance between image-side principal surface of second lens and image surface $S_i = 1.0$ mm
Lateral magnification $\beta = -0.5$
Full width of light source pixel group $W_O = 0.549$ mm
Total width of image surface pixel group $W_i = 0.2749$ mm (when substituted into the expression (24), $W_i \geqq 0.2745$ mm)
Focal length of second lens $f_2 = 1.5$ mm (when substituted into the expression (21), $f_2 \leqq 1.786$ mm)
Effective diameter of first lens (twice of maximum beam passage height on lens by actual beam tracing) $D_1 = 0.603$ mm
Effective diameter of second lens (twice of maximum beam passage height on lens by actual beam tracing) $D_2 = 0.604$ mm (when substituted into the expression (20), $D_2 \leqq 0.623$ mm)

Third Example
$r_1 = \infty$ (object surface)
$d_1 = 2.4688$
$r_2 = \infty$ (aperture)
$d_2 = 0.3000$
$r_3 = 1.1102$ (aspheric surface)
$d_3 = 0.4000$
$n_{d1} = 1.5168$
$\upsilon_{d1} = 64.2$ $K_3=-1.5873$
$r_4=-4.3114$
$d_4=0.7905$
$r_5=1.1686$ (aspheric surface)
$d_5=0.4000$
$n_{d2}=1.5168$
$\upsilon_{d2}=64.2$
$K_5=-4.0205$
$r_6=-2.2271$
$d_6=0.9000$
$r_7=\infty$ (image surface)
Used wavelength 632.5 nm
Image-side angle of aperture (half angle) $\theta_i=0.2618$ rad (15 deg)
Number of lens rows m=3
Gap between effective regions of second lens $\alpha=0.0$ mm
Distance between image-side principal surface of second lens and image surface $S_i=1.08$ mm
Lateral magnification $\beta=-0.5$
Full width of light source pixel group $W_O=0.5654$ mm
Total width of image surface pixel group $W_i=0.2827$ mm (when substituted into the expression (27), $W_i \geqq 0.2827$ mm)
Focal length of second lens $f_2=1.55$ mm (when substituted into the expression (26), $f_2 \leqq 1.619$ mm)
Effective diameter of first lens (twice of maximum beam passage height on lens by actual beam tracing) $D_1=0.846$ mm
Effective diameter of second lens (twice of maximum beam passage height on lens by actual beam tracing) $D_2=0.832$ mm (when substituted into the expression (20), $D_2 \leqq 0.848$ mm)

Fourth Example
$r_1=\infty$ (object surface)
$d_1=2.6633$
$r_2=\infty$ (aperture)
$d_2=0.2820$
$r_3=1.4742$
$d_2=0.4000$
$n_{d1}=1.5168$
$\upsilon_{d1}=64.2$
$r_4=-2.1005$ (aspheric surface)
$d_4=0.7000$
$K_4=-14.2827$
$r_5=1.3057$ (aspheric surface)
$d_5=0.4000$
$n_{d2}=1.5168$
$\upsilon_{d2}=64.2$
$K_5=-3.8466$
$r_6=-1.6956$
$d_6=0.8438$
$r_7=\infty$ (image surface)
Used wavelength 632.5 nm
Image-side angle of aperture (half angle) $\theta_i=0.2618$ rad (15 deg)
Number of lens rows m=3
Gap between effective regions of second lens $\alpha=0.0$ mm
Distance between image-side principal surface of second lens and image surface $S_i=1.05$ mm
Lateral magnification D=−0.476
Full width of light source pixel group $W_O=0.577$ mm
Total width of image surface pixel group $W_i=0.275$ mm (when substituted into the expression (27), $W_i \geqq 0.275$ mm)
Focal length of second lens $f_2=1.5$ mm (when substituted into the expression (26), $f_2 \leqq 1.575$ mm)
Effective diameter of first lens (twice of maximum beam passage height on lens by actual beam tracing) $D_1=0.775$ mm
Effective diameter of second lens (twice of maximum beam passage height on lens by actual beam tracing) $D_2=0.765$ mm (when substituted into the expression (20), $D_2 \leqq 0.825$ mm)
Maximum angle of view $\omega=5.895$ deg Fifth Example
$r_1=\infty$ (object surface)
$d_1=2.8041$
$r_2=\infty$ (aperture)=
$d_2=0.0000$
$r_3=1.4742$
$d_3=0.4000$
$n_{d1}=1.5168$
$\upsilon_{d1}=64.2$
$r_4=-2.1005$ (aspheric surface)=
$d_4=1.0914$
$K_4=-14.2827$
$r_5=1.3057$ (aspheric surface)=
$d_5=0.4000$
$n_{d2}=1.5168$
$\upsilon_{d2}=64.2$
$K_5=-3.8466$
$r_6=-1.6956$=
$d_6=0.8438$
$r_7=\infty$ (image surface)
Used wavelength 632.5 nm
Image-side angle of aperture (half angle) $\theta_i=0.2618$ rad (15 deg)
Number of lens rows m=3
Gap between effective regions of second lens $\alpha=0.0$ mm
Distance between image-side principal surface of second lens and image surface $S_i=1.05$ mm
Lateral magnification $\beta=-0.476$
Full width of light source pixel group $W_O=0.577$ mm
Total width of image surface pixel group $W_i=0.275$ mm (when substituted into the expression (27), $W_i \geqq 0.275$ mm)
Focal length of second lens $f_2=1.5$ mm (when substituted into the expression (26), $f_2 \leqq 1.575$ mm)
Effective diameter of first lens (twice of maximum beam passage height on lens by actual beam tracing) $D_1=0.787$ mm
Effective diameter of second lens (twice of maximum beam passage height on lens by actual beam tracing) $D_2=0.790$ mm (when substituted into the expression (20), $D_2 \leqq 0.825$ mm)
Maximum angle of view $\omega=5.601$ deg Sixth Example
$r_1=\infty$ (object surface)
$d_1=2.9660$
$r_2=\infty$ (aperture)
$d_2=0.0000$
$r_3=0.9662$ (aspheric surface)
$d_3=0.4000$
$n_{d1}=1.5168$
$\upsilon_1=64.2$
$K_3=-1.0020$
$A_3=-0.0095$
$r_4=\infty$
$d_4=1.2052$
$r_5=0.7727$ (aspheric surface)
$d_5=0.4023$
$n_{d2}=1.5168$
$\upsilon_{d2}=64.2$
$K_5=-1.2606$
$A_5=0.0000$
$r_6=\infty$
$d_6=0.8000$
$r_7=\infty$ (image surface)

Used wavelength 632.5 nm

Image-side angle of aperture (half angle) $\theta_i$=0.2618 rad (15 deg)

Number of lens rows m=3

Gap between effective regions of second lens $\alpha$=0.1 mm

Distance from image-side flat surface of second lens to image surface $d_2'$=0.8 mm Thickness of effective diameter portion of second lens $e_{t2}$=0.29464 mm Refractive index of second lens $n_2$=1.5151

Lateral magnification $\beta$=−0.5

Full width of light source pixel group $W_O$=0.640 mm

Total width of image surface pixel group $W_i$=0.320 mm (when substituted into the expression (41), $W_i \geq 0.3104$ mm)

Focal length of second lens $f_2$=1.5 mm (when substituted into the expression (21), $f_2 \leq 1.642$ mm)

Effective diameter of first lens (twice of maximum beam passage height on lens by actual beam tracing) $D_1$=0.821 mm Effective diameter of second lens (twice of maximum beam passage height on lens by actual beam tracing) $D_2$=0.831 mm (when substituted into the expression (20), $D_2 \leq 0.860$ mm)

Figure 35:
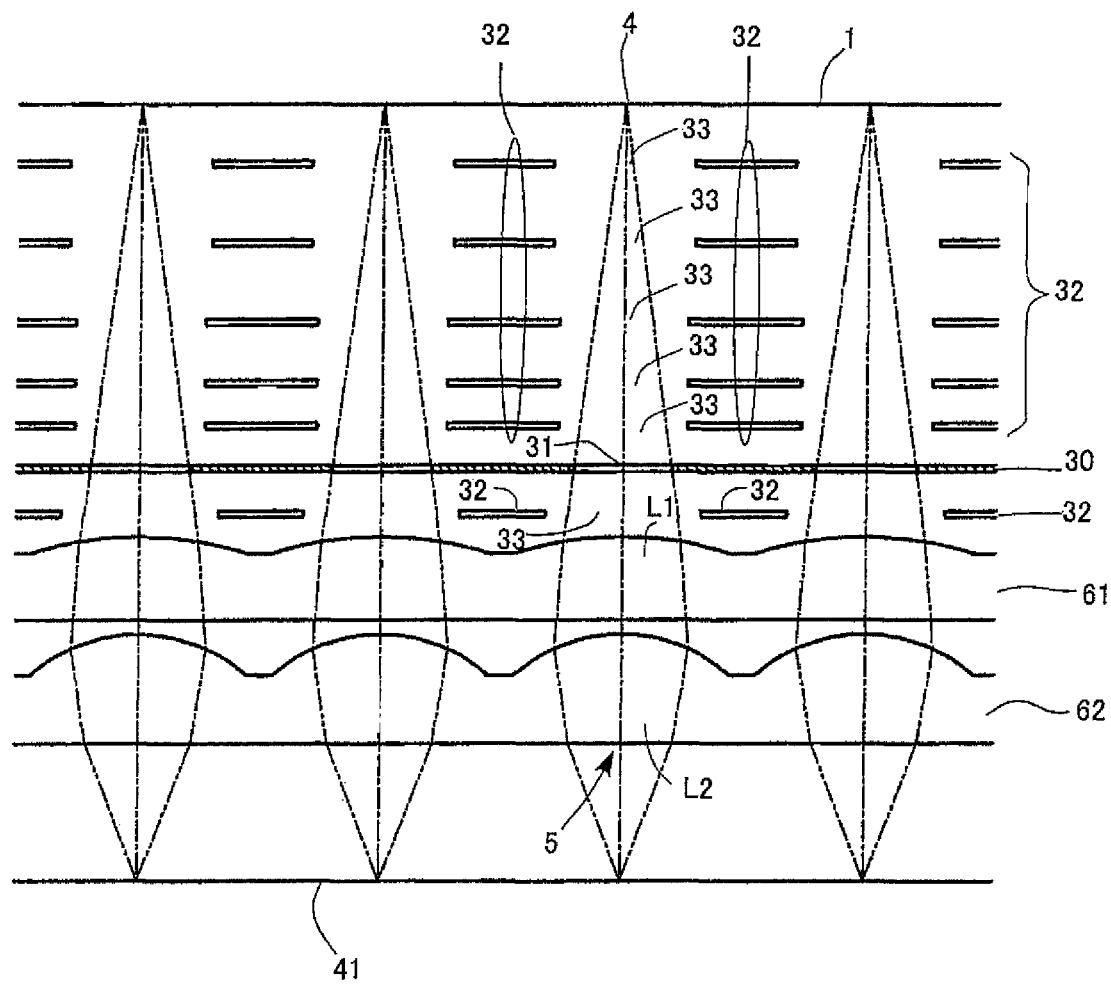
FIG. 35 is a cross-sectional view taken along the main scanning direction in an example where a flare aperture plate is disposed apart from an aperture plate in an optical system of an optical writing line head according to an embodiment of the invention.
Figure 36:
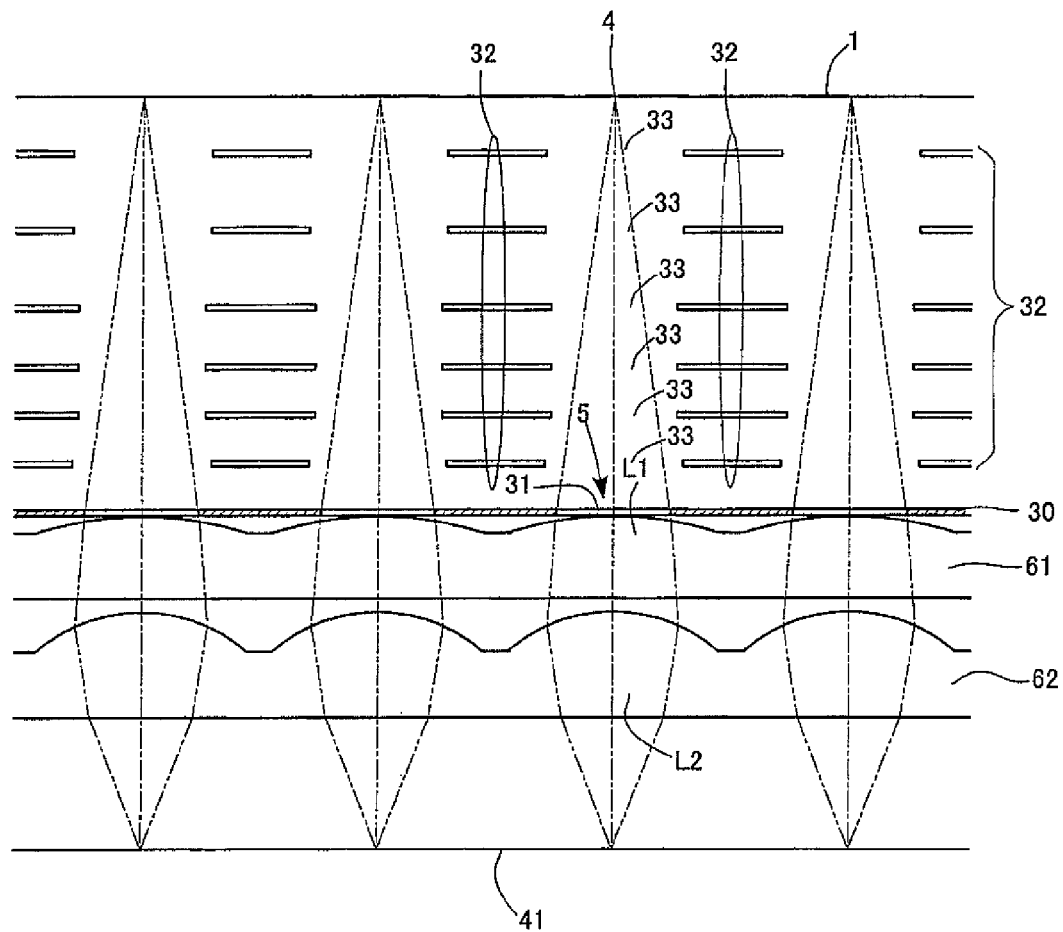
FIG. 36 is a cross-sectional view taken along the main scanning direction in another example where a flare aperture plate is disposed apart from an aperture plate in an optical system of an optical writing line head according to an embodiment of the invention.

In such an optical system of the optical writing line head according to the embodiment of the invention, it is preferable to dispose one or more flare aperture plates between the light emitter array 1 and the aperture plate 30 and between the aperture plate 30 and the microlens 5 (in the case shown in FIG. 21) or between the light emitter array 1 and the aperture plate 30 (in the case shown in FIG. 26) in order to prevent that light from the light emitter block 4, which is incident on the specific microlens 5 of the microlens array, is incident on an optical path of the adjacent microlens 5 and as a result, the flare is generated. A cross-sectional view taken along the main scanning direction in an example of the case is shown in FIGS. 35 and 36. In the case shown in FIG. 35, five flare aperture plates 32 are disposed between the light emitter array 1 and the aperture plate 30 and one flare aperture plates 32 is disposed between the aperture plate 30 and the microlens 5 at distances therebetween so as to be parallel to the aperture plate 30. In the case shown in FIG. 36, the six flare aperture plates 32 are disposed between the light emitter array 1 and the aperture plate 30 in the same manner as described above. Each flare aperture plate 32 is provided with an aperture 33 corresponding to the aperture 31 of the aperture plate 30. The aperture diaphragm in the invention means the aperture 31 of the aperture plate 30 but does not mean the aperture 33 of the flare aperture plate 32.

While the line head and the image forming apparatus using the same according to the embodiment of the invention have been described on the basis of the principles and the examples thereof, the invention is not limited to the examples but various modifications thereof may also be made.

What is claimed is:

1. A line head comprising:
    a positive lens system having two lenses with positive refractive power;
    an image-side lens array in which the image-side lens of the two lenses is arrayed in a plural number in first and second directions;
    an object-side lens array in which the object-side lens of the two lenses is arrayed in a plural number in the first and second directions;
    a light emitter array in which a plurality of light-emitting elements are arrayed on an object side of the positive lens system for the one positive lens system; and
    an aperture plate that forms an aperture diaphragm disposed on the object side of the positive lens system so that an image side is telecentric or approximately telecentric,
    wherein assuming that the row number of lenses arrayed in the second direction of the image-side lens array is m, a gap between effective regions of the two image-side lenses adjacent to each other in the first direction is $\alpha$, an image-side angle of aperture (half angle) of the positive lens system is $\theta_i$, a width (full width) of a plurality of light-emitting element images in the first direction, which are images on image surfaces of the plurality of light-emitting elements arrayed for the one positive lens system, is $W_i$, a focal length of the image-side lens is $f_2$, and a distance from an image-side principal plane of the image-side lens to the image surface is $S_i$, the following conditions, $$f_2 \leq (mW_i - \alpha)/(2\theta_i)$$

$$W_i \geq 2S_i\theta_i/(m-1) + \alpha/(m-1)$$

are satisfied.

2. The line head according to claim 1, wherein the width (full width) $W_i$ of the plurality of light-emitting element images in the first direction has the following condition, $$W_i = 2S_i\theta_i/(m-1) + \alpha/(m-1).$$

3. The line head according to claim 1, wherein the aperture plate is disposed adjacent to the object-side lens of the positive lens system.

4. An image forming apparatus comprising:
    a latent image carrier;
    a charging unit that electrically charges the latent image carrier;
    the line head according to claim 1; and
    a developing unit that develops the latent image carrier.

5. A line head comprising:
    a positive lens system having two lenses with positive refractive power;
    an image-side lens array in which the image-side lens of the two lenses is arrayed in a plural number in first and second directions;
    an object-side lens array in which the object-side lens of the two lenses is arrayed in a plural number in the first and second directions;
    a light emitter array in which a plurality of light-emitting elements are arrayed on an object side of the positive lens system for the one positive lens system; and
    an aperture plate that forms an aperture diaphragm disposed on the object side of the positive lens system so that an image side is telecentric or approximately telecentric,
    wherein assuming that the row number of lenses arrayed in the second direction of the lens array is m, an image-side angle of aperture (halt angle) of the positive lens system is $\theta_i$, a width (full width) of a plurality of light-emitting element images in the first direction, which are images on image surfaces of the plurality of light-emitting elements arrayed for the one positive lens system, is $W_i$, a focal length of the image-side lens is $f_2$, and a distance from an image-side principal plane of the image-side lens to the image surface is $S_i$, the following conditions, $$f_2 \leq mW_i/(2\theta_i)$$

$$W_i \geq 2S_i\theta_i/(m-1)$$

are satisfied.

6. The line head according to claim 5,
wherein the width (full width) $W_i$ of the plurality of light-emitting element images in the first direction has the following condition, $$W_i = 2S_i\theta_i/(m-1).$$

7. A line head comprising:
a positive lens system having two lenses with positive refractive power;
an image-side lens array in which the image-side lens of the two lenses is arrayed in a plural number in first and second directions;
an object-side lens array in which the object-side lens of the two lenses is arrayed in a plural number in the first and second directions;
a light emitter array in which a plurality of light-emitting elements are arrayed on an object side of the positive lens system for the one positive lens system; and
an aperture plate that forms an aperture diaphragm disposed on the object side of the positive lens system so that an image side is telecentric or approximately telecentric,
wherein the image-side lens is a plano-convex lens whose image-side surface is a flat surface, and
assuming that the row number of lenses arrayed in the second direction of the image-side lens array is m, a gap between effective regions of the two image-side lenses adjacent to each other in the first direction is α, an image-side angle of aperture (half angle) of the positive lens system is $\theta_i$, a width (full width) of a plurality of light-emitting element images in the first direction, which are images on image surfaces of the plurality of light-emitting elements arrayed for the one positive lens system, is $W_i$, a focal length of the image-side lens is $f_2$, and a distance from an image-side flat surface of the image-side lens to an image surface is $d_2'$, an optical-axis-direction distance from a point where an outermost light beam of light flux, which converges on the light-emitting element image located at the end in the first direction of the plurality of light-emitting element images that are images on image surfaces of the plurality of light-emitting elements arrayed for the one positive lens system, is incident on an object-side convex surface of the image-side lens to the image-side flat surface of the image-side lens is $e_{t2}$, and a refractive index of the image-side lens is $n_2$, the following conditions, $$f_2 \leq (mW_i - \alpha)/(2\theta_i)$$

$$W_i \geq 2(d_2' + e_{t2}/n_2)\theta_i/(m-1) + \alpha/(m-1)$$

are satisfied.

8. The line head according to claim 7,
wherein the width (full width) $W_i$ of the plurality of light-emitting element images in the first direction has the following condition, $$W_i = 2(d_2' + e_{t2}/n_2)\theta_i/(m-1) + \alpha/(m-1).$$

* * * * *